US012732712B2

(12) United States Patent
Kaizu et al.

(10) Patent No.: US 12,732,712 B2
(45) Date of Patent: Sep. 8, 2026

(54) SOLID-STATE IMAGING DEVICE AND ELECTRONIC DEVICE

(71) Applicant: Sony Semiconductor Solutions Corporation, Kanagawa (JP)

(72) Inventors: Shun Kaizu, Kanagawa (JP); Eiji Hirata, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 71 days.

(21) Appl. No.: 18/712,294

(22) PCT Filed: Dec. 28, 2022

(86) PCT No.: PCT/JP2022/048574
§ 371 (c)(1),
(2) Date: May 22, 2024

(87) PCT Pub. No.: WO2023/136169
PCT Pub. Date: Jul. 20, 2023

(65) Prior Publication Data
US 2025/0016464 A1 Jan. 9, 2025

(30) Foreign Application Priority Data
Jan. 12, 2022 (JP) ................................ 2022-003054

(51) Int. Cl.
*H04N 25/13* (2023.01)
*H04N 25/11* (2023.01)
(Continued)

(52) U.S. Cl.
CPC .......... *H04N 25/135* (2023.01); *H04N 25/77* (2023.01)

(58) Field of Classification Search
CPC ...... H04N 25/77; H04N 25/135; H04N 25/11; H04N 25/46; H04N 25/59; H04N 25/60;
(Continued)

(56) References Cited

U.S. PATENT DOCUMENTS 9,160,990 B2 * 10/2015 Kawai .................... H04N 23/12
2009/0195683 A1 8/2009 Honda
(Continued)

FOREIGN PATENT DOCUMENTS

JP 2010193200 A 9/2010
JP 2012104979 A 5/2012
(Continued)

OTHER PUBLICATIONS

International Search Report (PCT/ISA/210), International Application No. PCT/JP2022/048574, dated Mar. 28, 2023.

*Primary Examiner* — Marly S Camargo
(74) *Attorney, Agent, or Firm* — Michael Best & Friedrich LLP

(57) ABSTRACT

In one example, a solid-state imaging device includes a pixel array with pixels arrayed in a matrix. The pixels include first pixels that respectively include a photoelectric conversion section that performs photoelectric conversion of incident light; a transfer transistor that controls transfer of a charge generated in the photoelectric conversion section; a floating diffusion region that accumulates the charge transferred from the photoelectric conversion section via the transfer transistor; and an amplification transistor that causes a voltage signal corresponding to the charge accumulated in the floating diffusion region to emerge in a signal line. The first pixels are arrayed in a first diagonal direction in the pixel array, and at least two of the first pixels arrayed in the first diagonal direction share one region defined as the floating diffusion region.

16 Claims, 29 Drawing Sheets

(51) Int. Cl.
*H04N 25/46* (2023.01)
*H04N 25/77* (2023.01)
*H04N 25/778* (2023.01)

(58) Field of Classification Search
CPC .. H04N 25/134; H04N 25/583; H04N 25/778; H10F 39/182; H10F 39/802; H10F 39/813
See application file for complete search history.

(56) References Cited

U.S. PATENT DOCUMENTS

| | | | | |
|---|---|---|---|---|
| 2012/0113290 | A1* | 5/2012 | Nakata | H10F 3/151 348/222.1 |
| 2015/0002635 | A1 | 1/2015 | Kawai | |
| 2015/0029358 | A1* | 1/2015 | Kaizu | H04N 23/843 348/223.1 |
| 2015/0029376 | A1* | 1/2015 | Yamaguchi | H04N 25/78 348/308 |
| 2018/0205900 | A1* | 7/2018 | Nakata | H10F 39/8053 |
| 2021/0211597 | A1 | 7/2021 | Nakata | |

FOREIGN PATENT DOCUMENTS

| | | | |
|---|---|---|---|
| JP | 2013143730 | A | 7/2013 |
| JP | 2015026938 | A | 2/2015 |
| JP | 2016009872 | A | 1/2016 |
| WO | 2013145487 | A1 | 10/2013 |

* cited by examiner (A)
(B)
21A
30B
30B
30R
50A
30G
30R
50A
30G
50A
50A
GAP
X
Y
X
Y
R
G
B (A)
(B)
21C
50arw
50abw
30R
30W
30G
30B
W
R
G
B
X
Y

FIG.29

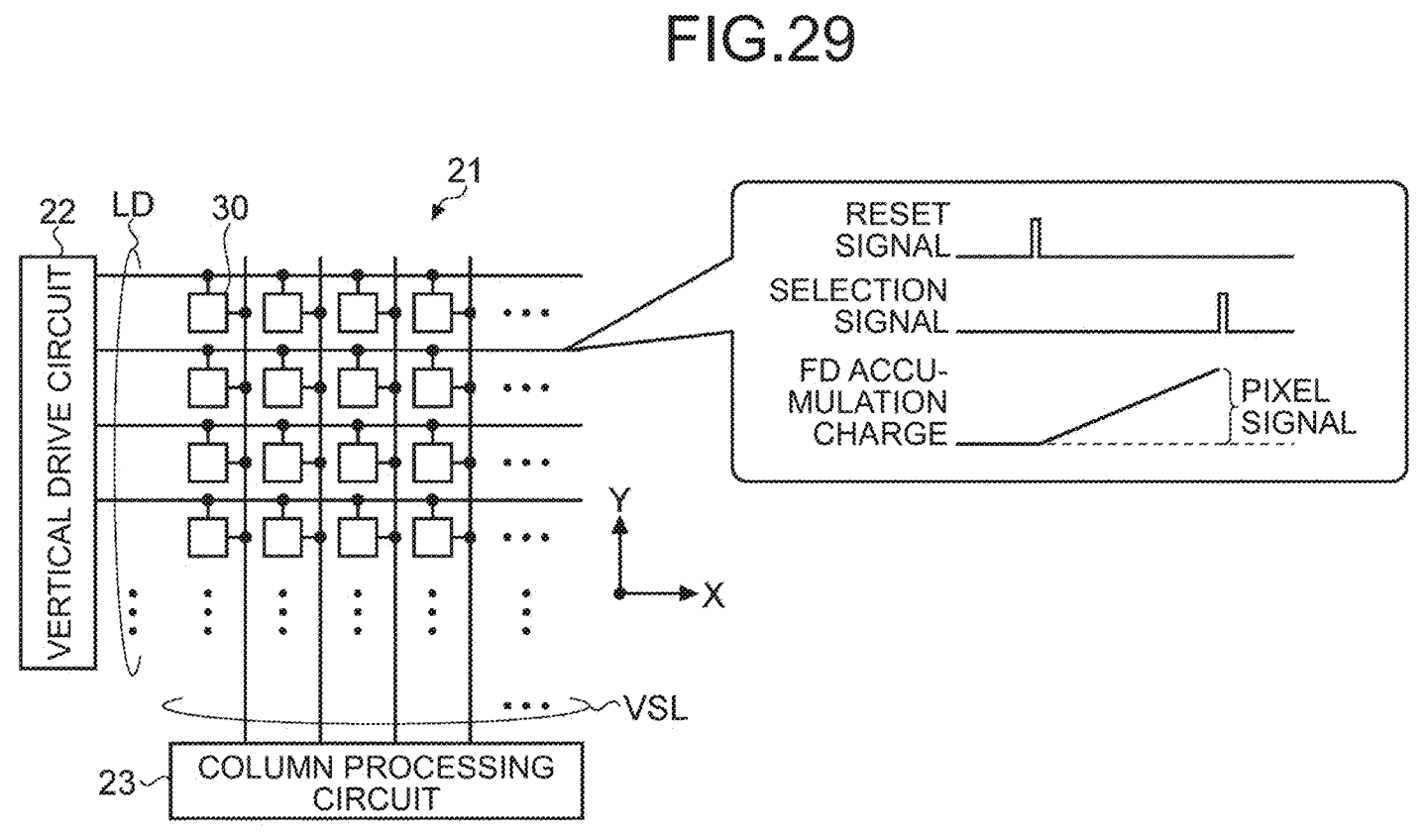

RESET SIGNAL
SELECTION SIGNAL
FD ACCUMULATION CHARGE
PIXEL SIGNAL
X
Y
VSL
21
30
LD
22
VERTICAL DRIVE CIRCUIT
23
COLUMN PROCESSING CIRCUIT (A)
(B)
(C)
321
30S
30L
#1
#2
#3
#4
X
Y

FIG.40

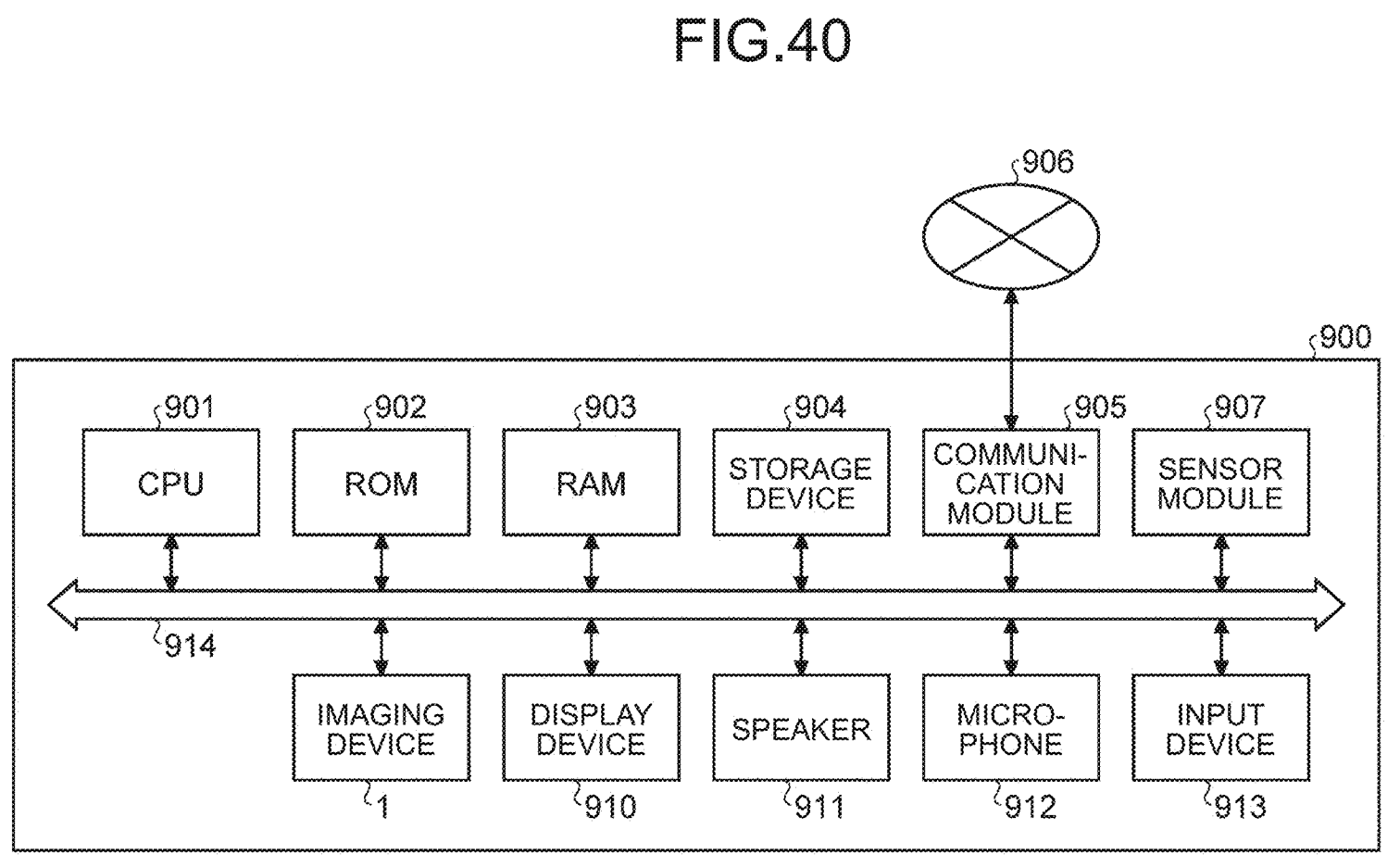

900
906
901 CPU
902 ROM
903 RAM
904 STORAGE DEVICE
905 COMMUNI-CATION MODULE
907 SENSOR MODULE
914
1 IMAGING DEVICE
910 DISPLAY DEVICE
911 SPEAKER
912 MICRO-PHONE
913 INPUT DEVICE

SOLID-STATE IMAGING DEVICE AND ELECTRONIC DEVICE

FIELD

The present disclosure relates to a solid-state imaging device and an electronic device.

BACKGROUND

In recent years, there is an image sensor (also referred to as a solid-state imaging device) that receives, by a plurality of pixels arrayed in a matrix, wavelength components of red (R), green (G), and blue (B) constituting three primary colors of light, thereby generating a color image. The image sensor capable of forming such a color image typically adopts a filter referred to as a Bayer array color filter in which color filters selectively transmitting wavelength components of red (R), green (G), and blue (B) are repeatedly arrayed in units of four pixels in a 2×2 pattern. Furthermore, there have been various types of color filter arrays such as a filter referred to as a quad Bayer array color filter in which each of individual color filters constituting the Bayer array is further divided into four (2×2) patterns.

CITATION LIST

Patent Literature

Patent Literature 1: JP 2010-193200 A

Patent Literature 2: JP 2013-143730 A

Patent Literature 3: JP 2016-9872 A

SUMMARY

Technical Problem

Meanwhile, the image sensors having been developed in recent years include an image sensor equipped with a function referred to as a binning mode, a mode including changing resolution. However, in a case where the resolution is changed in the conventional image sensor, there is a possibility of occurrence of image quality deterioration. For example, in the case of an image sensor adopting a Bayer array as a color filter, the image quality is high when imaging is performed in an all-pixel mode in which binning is not performed, but when the resolution is reduced by binning, there can be occurrence of jaggies or the like and degradation of image quality severer than the reduction in the resolution. Furthermore, for example, in an image sensor adopting a quad Bayer array as a color filter, the image quality is high in readout at low resolution, but there is a possibility of image quality degradation in the case of imaging in the all-pixel mode to be lower than the image quality in the case of adopting the Bayer array.

In view of this, the present disclosure proposes a solid-state imaging device and an electronic device capable of suppressing image quality degradation.

Solution to Problem

In order to solve the above problem, a solid-state imaging device according to one aspect of the present disclosure includes: a pixel array section in which a plurality of pixels is arrayed in a matrix, the pixels including a plurality of first pixels that performs photoelectric conversion of light of a first wavelength component, wherein each of the pixels includes: a photoelectric conversion section that performs photoelectric conversion of incident light; a transfer transistor that controls transfer of a charge generated in the photoelectric conversion section; a floating diffusion region that accumulates the charge transferred from the photoelectric conversion section via the transfer transistor; and an amplification transistor that causes a voltage signal corresponding to the charge accumulated in the floating diffusion region to emerge in a signal line, the plurality of first pixels is arrayed in a first diagonal direction in the pixel array section, and at least two first pixels of the plurality of first pixels arrayed in the first diagonal direction share one region defined as the floating diffusion region.

BRIEF DESCRIPTION OF DRAWINGS

FIG. 29 is a diagram illustrating shutter control in an image sensor adopting a rolling shutter system.

FIG. 40 is a block diagram illustrating an example of a schematic functional configuration of a smartphone.

DESCRIPTION OF EMBODIMENTS

Figure 1:
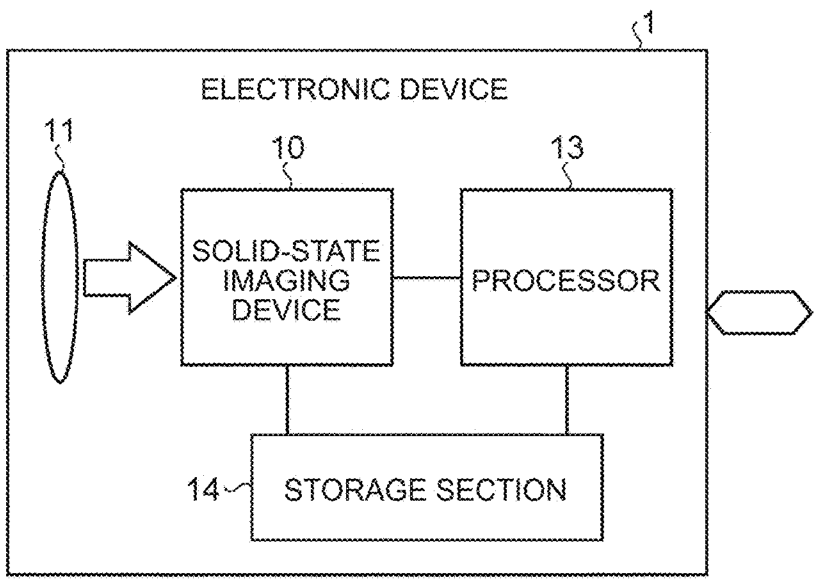
FIG. 1 is a block diagram illustrating a schematic configuration example of an electronic device equipped with a solid-state imaging device according to a first embodiment of the present disclosure.

An embodiment of the present disclosure will be described below in detail with reference to the drawings. In each of the following embodiments, the same parts are denoted by the same reference symbols, and a repetitive description thereof will be omitted.

The present disclosure will be described in the following order.

1. First Embodiment
1.1 Configuration example of electronic device (imaging device)
1.2 Configuration example of image sensor
1.3 Configuration example of pixel
1.3.1 Configuration example of pixel having FD sharing structure
1.4 Example of basic functions of unit pixel
1.5 Stacked structure example of image sensor
1.6 Basic structure example of pixel
1.7 Factors of image quality degradation
1.8 Suppression of image quality degradation
1.9 Remosaicing of pixel array
1.10 Correction of inter-pixel characteristic difference
1.11 Application to global shutter system
1.12 Application to other color filter array
1.13 Summary
2. Second Embodiment
2.1 Example of color filter array and pixel sharing structure
2.2 Modification of color filter array and pixel sharing structure
2.2.1 First modification
2.2.2 Second modification
2.2.3 Third modification
3. Third Embodiment
3.1 Modification
4. Example of application to smartphone
5. Example of application to mobile body
6. Example of application to endoscopic surgery system

1. First Embodiment

First, a first embodiment of the present disclosure will be described in detail with reference to the drawings. The present embodiment will describe a case where the technology according to the present embodiment is applied to a complementary metal-oxide semiconductor (CMOS) solid-state imaging device (hereinafter, also referred to as an image sensor). However, the type of image sensor is not limited thereto. For example, the technology according to the present embodiment is applicable to various sensors including a photoelectric conversion element, such as a charge coupled device (CCD) image sensor, a Time-of-Flight (ToF) sensor, and an Event-based Vision Sensor (EVS).

1.1 Configuration Example of Electronic Device (Imaging Device)

FIG. 1 is a block diagram illustrating a schematic configuration example of an electronic device (imaging device) equipped with an image sensor according to the first embodiment. As illustrated in FIG. 1, an imaging device 1 includes an imaging lens 11, an image sensor 10, a storage section 14, and a processor 13, for example.

The imaging lens 11 is an example of an optical system that condenses incident light and forms an image of the condensed light on a light receiving surface of the image sensor 10. The light receiving surface may be a surface of the image sensor 10 on which the photoelectric conversion elements are disposed in an array. The image sensor 10 performs photoelectric conversion of incident light to generate image data. Furthermore, the image sensor 10 executes predetermined signal processing such as noise removal and white balance adjustment on the generated image data.

The storage section 14 includes, for example, a flash drive, dynamic random access memory (DRAM), static random access memory (SRAM), or the like, and records image data or the like input from the image sensor 10.

The processor 13 is constituted by using, for example, a central processing unit (CPU) or the like, and may include an application processor that executes an operating system, various types of application software, or the like, a graphics processing unit (GPU), a baseband processor, and the like. The processor 13 executes various processes as necessary on the image data input from the image sensor 10, the image data read out from the storage section 14, and the like, executes display to the user, and transmits the image data to the outside via a predetermined network.

1.2 Configuration Example of Image Sensor

Figure 2:
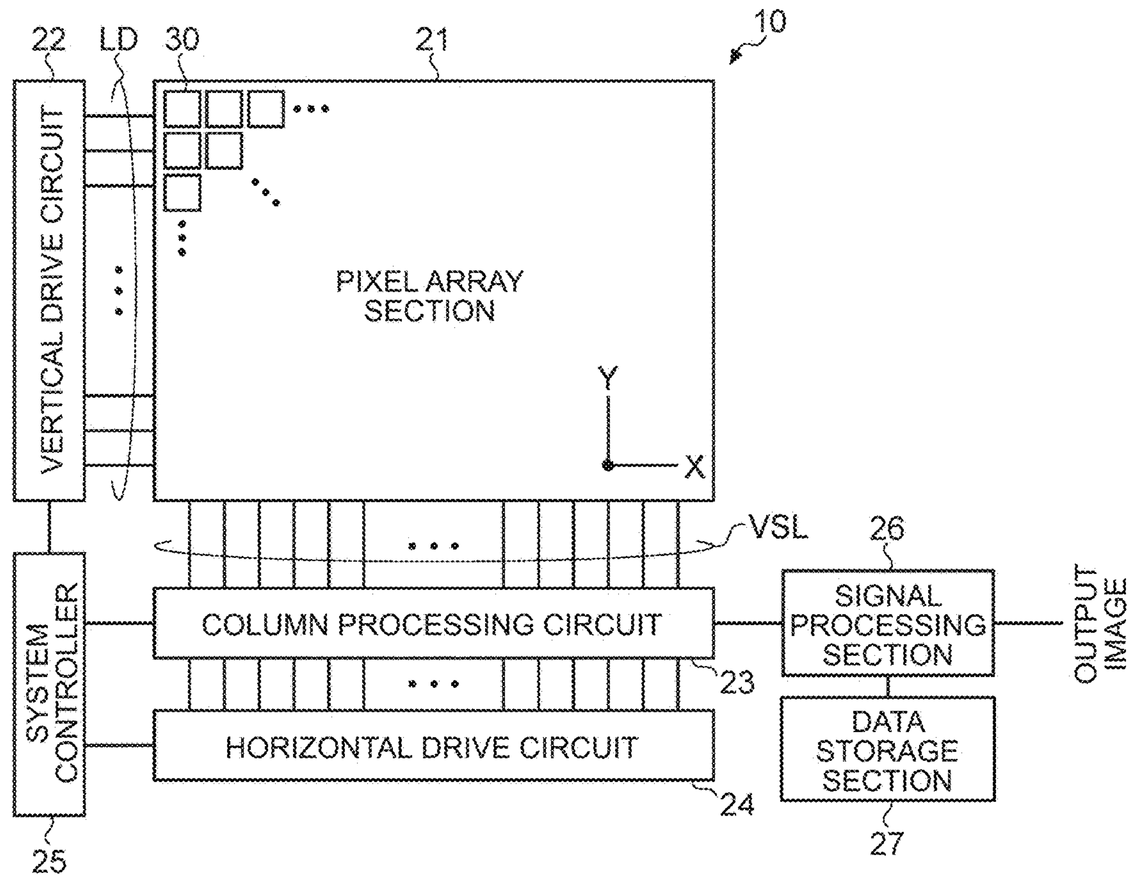
FIG. 2 is a block diagram illustrating a schematic configuration example of a CMOS solid-state imaging device according to the first embodiment of the present disclosure.

FIG. 2 is a block diagram illustrating a schematic configuration example of a CMOS image sensor according to the first embodiment. Here, the CMOS image sensor is an image sensor created by applying or partially using a CMOS process. For example, the image sensor 10 according to the present embodiment includes a back-illuminated image sensor.

Figure 5:
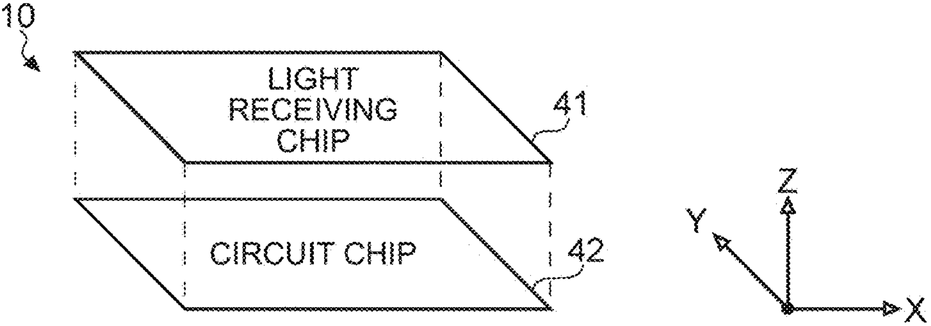
FIG. 5 is a diagram illustrating a stacked structure example of the image sensor according to the first embodiment of the present disclosure.

The image sensor 10 according to the present embodiment has, for example, a stacked structure including a stack of a light receiving chip 41 (substrate) on which a pixel array section 21 is disposed and a circuit chip 42 (substrate) on which a peripheral circuit is disposed (refer to FIG. 5, for example). The peripheral circuit can include a vertical drive circuit 22, a column processing circuit 23, a horizontal drive circuit 24, and a system controller 25, for example.

The image sensor 10 further includes a signal processing section 26 and a data storage section 27. The signal processing section 26 and the data storage section 27 may be located on the same semiconductor chip as the peripheral circuit, or may be located on a different semiconductor chip.

The pixel array section 21 has a configuration in which pixels 30, which includes a photoelectric conversion element that generates and accumulates charges according to the amount of received light, are disposed in a row direction and a column direction, that is, in a two-dimensional lattice shape in a matrix. Here, the row direction refers to a pixel arrangement direction in a pixel row (lateral direction in drawings), and the column direction refers to a pixel arrangement direction in a pixel column (vertical direction in drawings). Specific circuit configurations and pixel structures of the pixel 30 will be described below in detail.

The pixel array section 21 has pixel drive lines LD wired in the row direction for individual pixel rows while having vertical signal lines VSL wired in the column direction for individual pixel columns with regard to the pixel array in a matrix. The pixel drive line LD transmits a drive signal for conducting drive when a signal is read out from a pixel. Although FIG. 2 is a case where the pixel drive lines LD are illustrated as one-to-one wiring patterns, wiring patterns are not limited to this. One end of the pixel drive line LD is connected to an output terminal corresponding to each of rows of the vertical drive circuit 22.

The vertical drive circuit 22 includes a shift register, an address decoder, and the like, and drives all the pixels of the pixel array section 21 simultaneously or row by row. That is, together with the system controller 25 that controls the vertical drive circuit 22, the vertical drive circuit 22 constitutes a drive section that controls the operation of each of pixels of the pixel array section 21. Although a specific configuration of the vertical drive circuit 22 is not illustrated, the vertical drive circuit typically includes two scan systems, namely, a read-out scan system and a sweep-out scan system.

In order to read out a signal from the pixel 30, the read-out scan system sequentially performs selective scan of pixels 30 of the pixel array section 21 row by row. The signal read out from the pixel 30 is an analog signal. The sweep-out scan system performs sweep-out scan on a read out row on which read-out scan is to be performed by the read-out scan system, prior to the read-out scan by an exposure time.

By the sweep-out scan by the sweep-out scan system, unnecessary charges are swept out from the photoelectric conversion element of the pixel 30 of the read-out target row, and the photoelectric conversion element is reset. By sweeping out (resetting) unnecessary charges in the sweep-out scan system, an electronic shutter operation is performed. Here, the electronic shutter operation refers to an operation of discarding charges of the photoelectric conversion element and newly starting exposure (starting accumulation of charges).

The signal read out by the readout operation by the readout scan system corresponds to the amount of light received after the immediately preceding readout operation or electronic shutter operation. The period from the readout timing by the immediately preceding readout operation or the sweep-out timing of the electronic shutter operation to the readout timing of the current readout operation corresponds to a charge accumulation period (also referred to as an exposure period) in each pixel 30.

A signal output from each pixel 30 in the pixel row selectively scanned by the vertical drive circuit 22 is input to the column processing circuit 23 via each of the vertical signal lines VSL for each pixel column. The column processing circuit 23 performs predetermined signal processing on the signal output from each pixel of the selected row through the vertical signal line VSL for each of the pixel columns of the pixel array section 21, and temporarily holds the pixel signal after the signal processing.

Specifically, the column processing circuit 23 performs at least a noise removal process, for example, a correlated double sampling (CDS) process or a double data sampling (DDS) process, as the signal processing. For example, the CDS processing removes the fixed pattern noise unique to the pixel such as the reset noise and the threshold variation of the amplification transistor in the pixel. The column processing circuit 23 also has an analog-digital (AD) conversion function, for example, and converts an analog pixel signal obtained by reading out from the photoelectric conversion element into a digital signal, and outputs the digital signal.

The horizontal drive circuit 24 includes a shift register, an address decoder, and the like, and sequentially selects a read-out circuit (hereinafter, also referred to as a pixel circuit) corresponding to a pixel column of the column processing circuit 23. By the selective scan performed by the horizontal drive circuit 24, pixel signals subjected to signal processing for each pixel circuit in the column processing circuit 23 are sequentially output.

The system controller 25 includes a timing generator that generates various timing signals and the like, and performs drive control of the vertical drive circuit 22, the column processing circuit 23, the horizontal drive circuit 24, and the like based on various timings generated by the timing generator.

The signal processing section 26 has at least an arithmetic processing function, and performs various signal processing such as arithmetic processing on the pixel signal output from the column processing circuit 23. The data storage section 27 temporarily stores data necessary for processes at signal processing in the signal processing section 26.

Note that the image data output from the signal processing section 26 may be subjected to predetermined processing in the processor 13 or the like in the imaging device 1 equipped with the image sensor 10, or may be transmitted to the outside via a predetermined network, for example.

1.3 Configuration Example of Pixel

Figure 3:
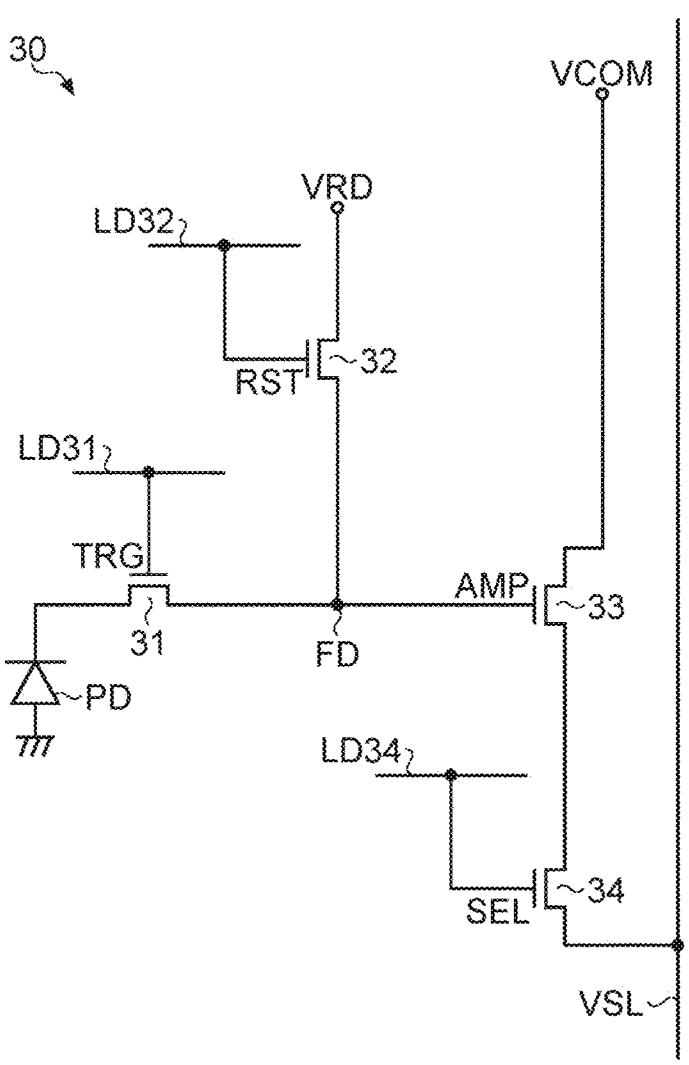
FIG. 3 is a circuit diagram illustrating a schematic configuration example of a pixel according to the first embodiment of the present disclosure.

FIG. 3 is a circuit diagram illustrating a schematic configuration example of a pixel according to the present embodiment. As illustrated in FIG. 3, the pixel 30 includes, for example, a photoelectric conversion section PD, a transfer transistor 31, a floating diffusion region FD, a reset transistor 32, an amplification transistor 33, and a selection transistor 34.

In the following description, the reset transistor 32, the amplification transistor 33, and the selection transistor 34 are also collectively referred to as a pixel circuit. The pixel circuit may include at least one of the floating diffusion region FD and the transfer transistor 31.

The photoelectric conversion section PD performs photoelectric conversion of incident light. The transfer transistor 31 transfers the charge generated in the photoelectric conversion section PD. The floating diffusion region FD accumulates the charge transferred by the transfer transistor 31. The amplification transistor 33 causes a pixel signal having a voltage corresponding to the charge accumulated in the floating diffusion region FD to emerge in the vertical signal line VSL. The reset transistor 32 appropriately releases the charges accumulated in the floating diffusion region FD and the photoelectric conversion section PD. The selection transistor 34 selects the pixel 30 as a readout target.

The photoelectric conversion section PD has its anode grounded and its cathode connected to the source of the transfer transistor 31. The drain of the transfer transistor 31 is connected to the source of the reset transistor 32 and the gate of the amplification transistor 33, and this connection node constitutes the floating diffusion region FD.

The reset transistor 32 is connected between the floating diffusion region FD and a vertical reset input line VRD. The drain of the reset transistor 32 is connected to the vertical reset input line VRD, and the source of the amplification transistor 33 is connected to a vertical current supply line VCOM. The drain of the amplification transistor 33 is connected to the source of the selection transistor 34, while the drain of the selection transistor 34 is connected to the vertical signal line VSL.

Individual gates are connected to the vertical drive circuit 22, specifically, the gate of the transfer transistor 31 is connected via the transfer transistor drive line LD31, the gate of the reset transistor 32 is connected via the reset transistor drive line LD32, and the gate of the selection transistor 34 is connected via the selection transistor drive line LD34, individually to the vertical drive circuit 22, and a pulse signal as a drive signal is supplied to each connection.

In such a configuration, the potential of the capacitance provided by the floating diffusion region FD is determined by the charges accumulated therein and the capacitance of the floating diffusion region FD. The capacitance of the floating diffusion region FD is determined by the capacitance of the diffusion region of the drain of the transfer transistor 31, the capacitance of the source diffusion region of the reset transistor 32, the capacitance of the gate of the amplification transistor 33, and the like, in addition to the ground capacitance.

1.3.1 Configuration Example of Pixel Having FD Sharing Structure

Figure 4:
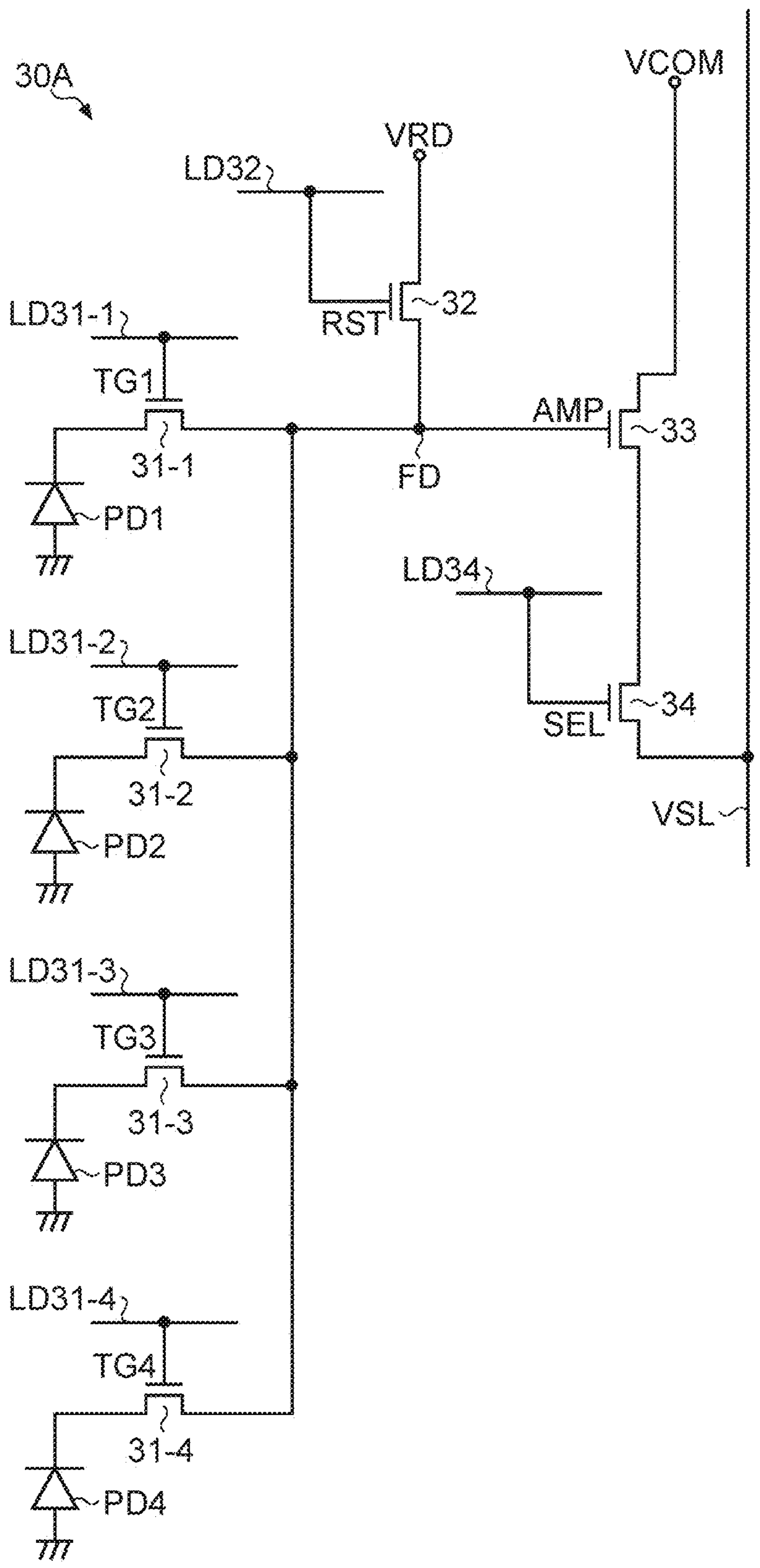
FIG. 4 is a circuit diagram illustrating a schematic configuration example of a pixel having an FD sharing structure according to the first embodiment of the present disclosure.

FIG. 4 is a circuit diagram illustrating a schematic configuration example of a pixel having a floating diffusion (FD) sharing structure according to the present embodiment. As illustrated in FIG. 4, a pixel 30A has a structure in which a plurality of (In this example, four) photoelectric conversion sections PD1 to PD4 are connected to one floating diffusion region FD via individual transfer transistors 31-1 to 31-4, respectively, in a configuration similar to that of the pixel 30 described above with reference to FIG. 3. Note that the floating diffusion region FD is connected with a pixel circuit shared by pixels 30A sharing the floating diffusion region FD.

In such a configuration, each of the transfer transistors 31L and 31R are connected, on their gates, with different transfer transistor drive lines LD 31L and LD 31R, so as to be driven independently.

1.4 Example of Basic Functions of Unit Pixel

Next, a basic function of the pixel 30 will be described. The reset transistor 32 turns on/off the discharge of the charges accumulated in the floating diffusion region FD in accordance with a reset signal RST supplied from the vertical drive circuit 22. At that time, it is also possible to discharge the charge accumulated in the photoelectric conversion section PD by turning on the transfer transistor 31.

When a reset signal RST at a high level is input to the gate of the reset transistor 32, the floating diffusion region FD is clamped (fixed) to a voltage applied through the vertical reset input line VRD. With this operation, the charges accumulated in the floating diffusion region FD are discharged (reset). At that time, by inputting the high-level transfer signal TRG to the gate of the transfer transistor 31, the charge accumulated in the photoelectric conversion section PD is also discharged (reset).

Incidentally, when the reset signal RST at a low level is input to the gate of the reset transistor 32, the floating diffusion region FD is electrically disconnected from the vertical reset input line VRD and comes into a floating state.

The photoelectric conversion section PD performs photoelectric conversion of incident light and generates a charge corresponding to the amount of light. The generated charge is accumulated on the cathode side of the photoelectric conversion section PD. The transfer transistor 31 turns on/off the transfer of the charge from the photoelectric conversion section PD to the floating diffusion region FD in accordance with a transfer control signal TRG supplied from the vertical drive circuit 22. For example, when the transfer control signal TRG at the high level is input to the gate of the transfer transistor 31, the charge accumulated in the photoelectric conversion section PD is transferred to the floating diffusion region FD. On the other hand, when the transfer control signal TRG at the low level is supplied to the gate of the transfer transistor 31, the transfer of the charge from the photoelectric conversion section PD is stopped. While the transfer transistor 31 stops transferring charges to the floating diffusion region FD, the charges obtained by photoelectric conversion are accumulated in the photoelectric conversion section PD.

The floating diffusion region FD has a function of accumulating the charge transferred from the photoelectric conversion section PD via the transfer transistor 31 and converting the accumulated charge into a voltage. Therefore, in the floating state in which the reset transistor 32 is turned off, the potential of the floating diffusion region FD is modulated in accordance with charge amounts individually accumulated.

The amplification transistor 33 functions as an amplifier using a potential fluctuation of the floating diffusion region FD connected to the gate of the transistor 33 as an input signal. An output voltage signal from the amplification transistor 33 is output as a pixel signal to the vertical signal line VSL via the selection transistor 34.

The selection transistor 34 turns on/off the output of the voltage signal from the amplification transistor 33 to the vertical signal line VSL in accordance with a selection control signal SEL supplied from the vertical drive circuit 22. For example, when the high-level selection control signal SEL is input to the gate of the selection transistor 34, the voltage signal from the amplification transistor 33 is output to the vertical signal line VSL, and when the low-level selection control signal SEL is input, the output of the voltage signal to the vertical signal line VSL is stopped. This makes it possible to extract only the output of the selected pixel 30 in the vertical signal line VSL connect to the plurality of pixels.

In this manner, the pixel 30 is driven in accordance with the transfer control signal TRG, the reset signal RST, a switching control signal FDG, and the selection control signal SEL supplied from the vertical drive circuit 22.

1.5 Stacked Structure Example of Image Sensor

FIG. 5 is a diagram illustrating a stacked structure example of the image sensor according to the present embodiment. As illustrated in FIG. 5, the image sensor 10 has a structure in which the light receiving chip 41 and the circuit chip 42 are vertically stacked. The light receiving chip 41 has a structure in which the light receiving chip 41 and the circuit chip 42 are stacked. The light receiving chip 41 is, for example, a semiconductor chip including the pixel array section 21 including an array of the photoelectric conversion sections PD, while the circuit chip 42 is, for example, a semiconductor chip including an array of pixel circuits.

For example, the light receiving chip 41 and the circuit chip 42 can be bonded to each other by using direct bonding in which the bonding surfaces of the chips are flattened and then the chips are bonded to each other by an electronic force. However, the bonding method is not limited thereto, and for example, it is also allowable to use other bonding methods such as Cu—Cu bonding in which copper (Cu) electrode pads formed on the bonding surfaces are bonded to each other, or bump bonding.

In addition, the light receiving chip 41 and the circuit chip 42 are electrically connected via a connection portion such as a through-silicon via (TSV) being a penetrating contact that penetrates the semiconductor substrate, for example. The connection using the TSV is implemented by adopting a method such as a twin TSV method in which two TSVs, that is, a TSV provided in the light receiving chip 41 and a TSV provided from the light receiving chip 41 to the circuit chip 42 are connected to each other on an outer surface of the chip, or a shared TSV method in which both chips are connected by a TSV penetrating from the light receiving chip 41 to the circuit chip 42, for example.

Note that, in a case where the light receiving chip 41 and the circuit chip 42 are bonded to each other by using Cu—Cu bonding or bump bonding, the chips are electrically connected via a Cu—Cu bonding portion or a bump bonding portion.

1.6 Basic Structure Example of Pixel

Figure 6:
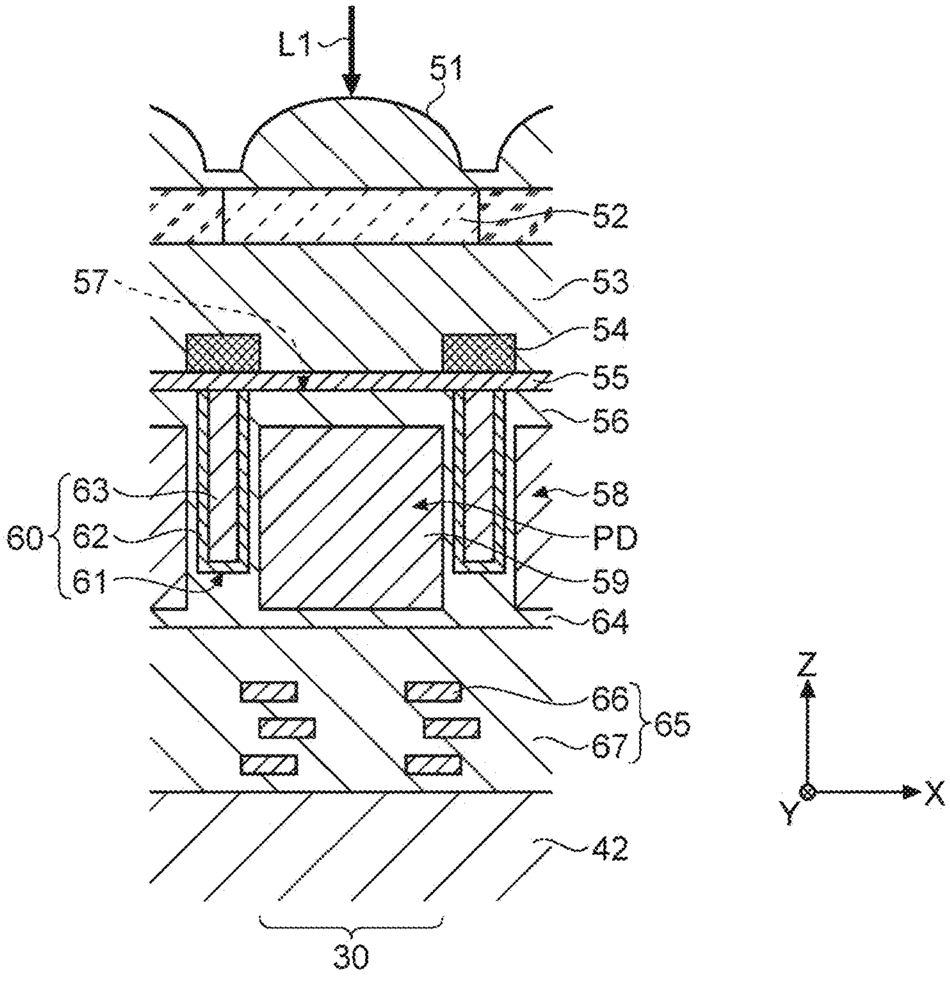
FIG. 6 is a cross-sectional view illustrating a basic cross-sectional structure example of a pixel according to the first embodiment of the present disclosure.

Next, a basic structure example of the pixel according to the first embodiment will be described with reference to FIG. 6 with reference to the pixel 30 illustrated in FIG. 3. Note that the basic structure example of the pixel 30A illustrated in FIG. 4 may be similar. FIG. 6 is a cross-sectional view illustrating a basic cross-sectional structure example of the pixel according to the first embodiment. Note that FIG. 6 illustrates a cross-sectional structure example of the light receiving chip 41 in which the photoelectric conversion section PD is arranged in the case of the pixel 30.

As illustrated in FIG. 6, in the image sensor 10, the photoelectric conversion section PD receives incident light L1 incident from the back surface (upper surface in the drawing) side of a semiconductor substrate 58. Components disposed above the photoelectric conversion section PD include a planarization film 53, a color filter 52, and an on-chip lens 51. By sequentially passing through the individual sections, photoelectric conversion is performed on the incident light L1 incident on the semiconductor substrate 58 from the light receiving surface 57.

The semiconductor substrate 58 may use, for example, a semiconductor substrate formed of a group IV semiconductor composed of at least one of carbon (C), silicon (Si), germanium (Ge), and tin (Sn), or a semiconductor substrate formed of a group III-V semiconductor composed of at least two of boron (B), aluminum (Al), gallium (Ga), indium (In), nitrogen (N), phosphorus (P), arsenic (As), and antimony (Sb). However, the material is not limited thereto, and various semiconductor substrates may be used.

The photoelectric conversion section PD may have, for example, a structure in which an N-type semiconductor region 59 is formed as a charge accumulation region that accumulates charges (electrons). In the photoelectric conversion section PD, the N-type semiconductor region 59 is provided in a region surrounded by P-type semiconductor regions 56 and 64 of the semiconductor substrate 58. On a front surface (lower surface) side of the semiconductor substrate 58 in the N-type semiconductor region 59, there is provided the P-type semiconductor region 64 having a higher impurity concentration than that of the back surface (upper surface) side. That is, the photoelectric conversion section PD has a hole-accumulation diode (HAD) structure, and the P-type semiconductor regions 56 and 64 are provided so as to suppress generation of a dark current at each interface on the upper surface side and the lower surface side of the N-type semiconductor region 59.

The semiconductor substrate 58 has a pixel isolation section 60 that electrically isolates the plurality of pixels 30 from each other. The photoelectric conversion section PD is located in each region partitioned by the pixel isolation section 60. When the image sensor 10 is viewed from the upper surface side in the drawing, the pixel isolation section 60 is provided in a lattice shape so as to be interposed between the plurality of pixels 30, for example, and the photoelectric conversion section PD is disposed in a region partitioned by the pixel isolation section 60.

In each photoelectric conversion section PD, an anode is grounded. In the image sensor 10, signal charges (for example, electrons) accumulated by the photoelectric conversion section PD are read out via the transfer transistor 31 not illustrated (refer to FIG. 3) or the like, and are output to the vertical signal line VSL not illustrated (refer to FIG. 3), as an electric signal.

A wiring layer 65 is provided on a front surface (lower surface) of the semiconductor substrate 58, which is a side opposite to a back surface (upper surface) including individual sections such as a light shielding film 54, the planarization film 53, the color filter 52, and the on-chip lens 51.

The wiring layer 65 includes a wiring line 66, an insulating layer 67, and a through-substrate electrode (not illustrated). The electric signal from the light receiving chip 41 is transmitted to the circuit chip 42 via the wiring line 66 and the through-substrate electrode (not illustrated). Similarly, the substrate potential of the light receiving chip 41 is also applied from the circuit chip 42 via the wiring line 66 and the through-substrate electrode (not illustrated).

For example, the surface of the wiring layer 65 opposite to the side including the photoelectric conversion section PD is joined with the circuit chip 42 illustrated in FIG. 5.

The light shielding film 54 is provided on the back surface (upper surface in the drawing) side of the semiconductor substrate 58, and shields a part of the incident light L1 directed from above the semiconductor substrate 58 toward the back surface of the semiconductor substrate 58.

The light shielding film 54 is located above the pixel isolation section 60 provided inside the semiconductor substrate 58. Here, the light shielding film 54 is provided so as to protrude to make a projection via an insulating film 55 such as a silicon oxide film on the back surface (upper surface) of the semiconductor substrate 58. In contrast, the portion above the photoelectric conversion section PD provided inside the semiconductor substrate 58 is formed as an opening with no light shielding film 54 so as to allow the incident light L1 to be incident on the photoelectric conversion section PD.

That is, when the image sensor 10 is viewed from the upper surface side in the drawing, the shape of the light shielding film 54 in plan view is a lattice shape, provided with an opening through which the incident light L1 passes to the light receiving surface 57.

The light shielding film 54 is formed of a light shielding material that shields light. For example, the light shielding film 54 is formed by sequentially stacking a titanium (Ti) film and a tungsten (W) film. As another method, the light shielding film 54 can be formed by sequentially stacking a titanium nitride (TiN) film and a tungsten (W) film, for example.

The light shielding film 54 is covered with the planarization film 53. The planarization film 53 is formed using an insulating material that transmits light. An applicable example of the insulating material is silicon oxide ($SiO_2$).

The pixel isolation section 60 includes, for example, a groove 61, a fixed charge film 62, and an insulating film 63, and is provided on the back surface (upper surface) side of the semiconductor substrate 58 so as to cover the groove 61 that partitions the plurality of pixels 30.

Specifically, the fixed charge film 62 is provided so as to cover, with a constant thickness, the inner surface of the groove 61 formed on the back surface (upper surface) side of the semiconductor substrate 58. In addition, the insulating film 63 is provided (filled) so as to fill the inside of the groove 61 covered with the fixed charge film 62.

Here, the fixed charge film 62 is formed using, for example, a high dielectric having a negative fixed charge so as to form a positive charge (hole) accumulation region at an interface with the semiconductor substrate 58 to suppress generation of a dark current. Since the fixed charge film 62 has a negative fixed charge, an electric field is applied to the interface with the semiconductor substrate 58 by the negative fixed charge, leading to formation of the positive charge (hole) accumulation region.

The fixed charge film 62 can be formed of hafnium oxide film ($HfO_2$ film), for example. In addition, the fixed charge film 62 can be formed to contain at least one of oxides using a material such as hafnium, zirconium, aluminum, tantalum, titanium, magnesium, yttrium, and lanthanoid elements, for example.

Note that the pixel isolation section 60 can be variously modified, not limited to the above configuration. For example, by using a reflective film that reflects light, such as a tungsten (W) film, instead of the insulating film 63, the pixel isolation section 60 can have a light reflection structure. This makes it possible to reflect the incident light L1 entering the photoelectric conversion section PD by the pixel isolation section 60, enabling extension of the optical path length of the incident light L1 in the photoelectric conversion section PD. In addition, since the pixel isolation section 60 has a light reflection structure, it is possible to reduce leakage of light to adjacent pixels, leading to further improvement of image quality, distance measurement accuracy, and the like. In a case where a metal material such as tungsten (W) is used as the material of the reflection film, it is preferable to provide an insulating film such as a silicon oxide film instead of the fixed charge film 62, in the groove 61.

Furthermore, the configuration in which the pixel isolation section 60 has the light reflection structure is not limited to the configuration using the reflection film, and can be implemented by embedding a material having a higher refractive index or a lower refractive index than the semiconductor substrate 58 in the groove 61, for example.

Furthermore, although FIG. 6 illustrates the pixel isolation section 60 having a structure referred to as a reverse deep trench isolation (RDTI) structure in which the pixel isolation section 60 is provided in the groove 61 formed from the back surface (upper surface) side of the semiconductor substrate 58, the pixel isolation section 60 is not limited thereto. For example, it is possible to adopt the pixel isolation section 60 having various structures such as a structure referred to as a deep trench isolation (DTI) structure in which the pixel isolation section 60 is provided in the groove formed from the front surface (lower surface) side of the semiconductor substrate 58 and a structure referred to as a full trench isolation (FTI) structure in which the pixel isolation section 60 is provided in the groove formed so as to penetrate the front and back surfaces of the semiconductor substrate 58.

1.7 Factors of Image Quality Degradation

Next, a factor of image quality degradation that occurs when the resolution is changed will be described with examples of some color filter arrays.

Figure 7:
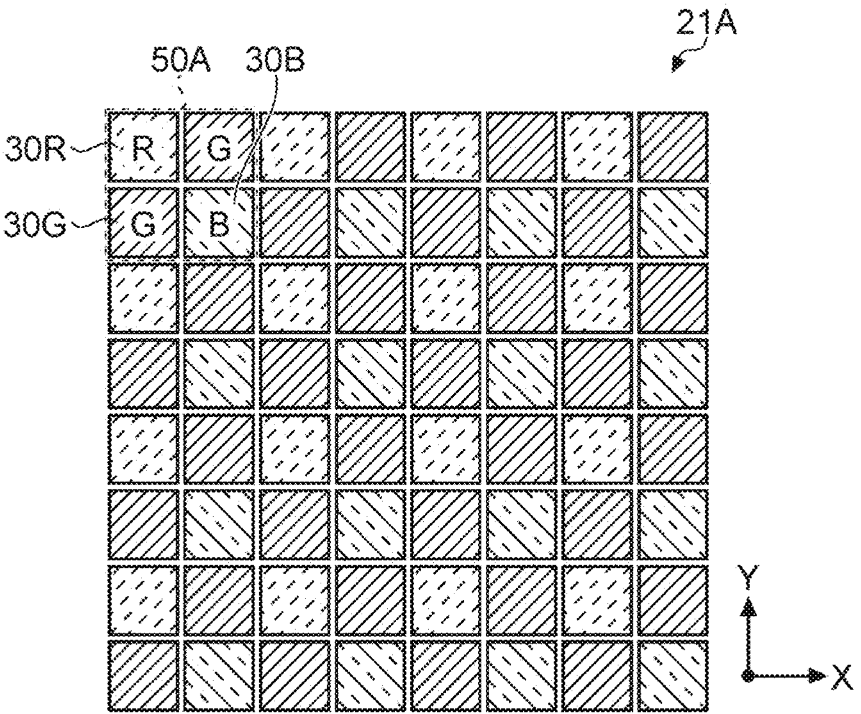
FIG. 7 is a plan view illustrating a pixel layout example according to the first embodiment of the present disclosure in a case where a Bayer array is adopted as a color filter array.

FIG. 7 is a plan view illustrating a pixel layout example in a case where the Bayer array is adopted as the color filter array. As illustrated in FIG. 7, the Bayer array has a structure in which a basic units 50A is regularly repeated in row/column directions. The basic unit 50A has a pattern in which a pixel 30 in which a color filter 52 that mainly transmits a red (R) wavelength component is disposed (also referred to as an R pixel 30R), a pixel 30 in which a color filter 52 that mainly transmits a green (G) wavelength component is disposed (also referred to as a G pixel 30G), and a pixel 30 in which a color filter 52 that mainly transmits a blue (B) wavelength component is disposed (also referred to as a B pixel 30B) are regularly arrayed in a 2×2 matrix at a ratio of R:G:B=1:2:1.

Figure 8:
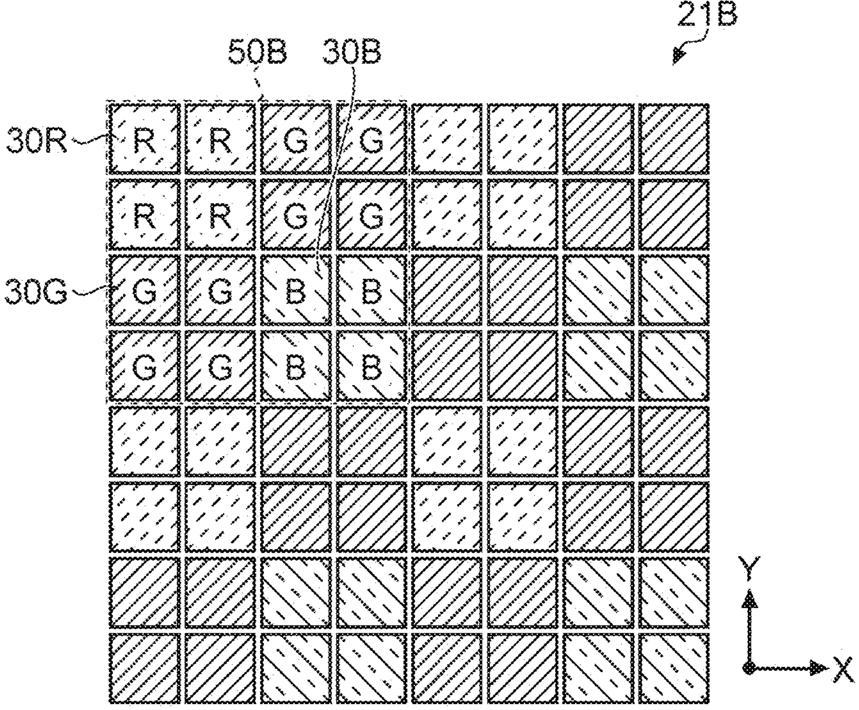
FIG. 8 is a plan view illustrating a pixel layout example according to the first embodiment of the present disclosure in a case where a quad Bayer array is adopted as the color filter array.

FIG. 8 is a diagram illustrating a planar layout example in a case where a quad Bayer array is adopted as the color filter array. As illustrated in FIG. 8, a pixel array section 21B formed as a quad Bayer array has a structure in which a basic units 50B is repeated in row/column directions. The basic unit 50B has a configuration in which each pixel 30 in the Bayer array is divided into four pixels 30 of the same color arrayed in a 2×2 matrix.

The color filter array that can be adopted in the present embodiment is not limited to the exemplified Bayer array and quad Bayer array, and various color filter arrays may be adopted.

The conventional image sensor adopting such a color filter array has a possibility of degradation of image quality in a case where the resolution is changed. For example, in the case of adopting a Bayer array as a color filter, the image quality is high in a case where imaging is performed in an all-pixel mode in which binning is not performed, but in a case where the resolution is reduced by binning, there are possibilities of occurrence of jaggies or the like and degradation of image quality severer than the reduction in the resolution. On the other hand, for example, in the case of adopting a quad Bayer array as a color filter, the image quality is high in readout at low resolution, but there is a possibility of reduction of image quality in the case of imaging in the all-pixel mode to be lower than the image quality in the case of adopting the Bayer array.

Furthermore, performing readout in the all-pixel mode by the image sensor capable of high resolution imaging would cause problems such as a decrease in frame rate and an increase in power consumption. In order to cope with such a problem, the image sensor can be equipped with, for example, a binning mode of performing readout with reduced resolution by pixel addition in situations such as monitoring before imaging and capturing of moving images.

Figure 9:
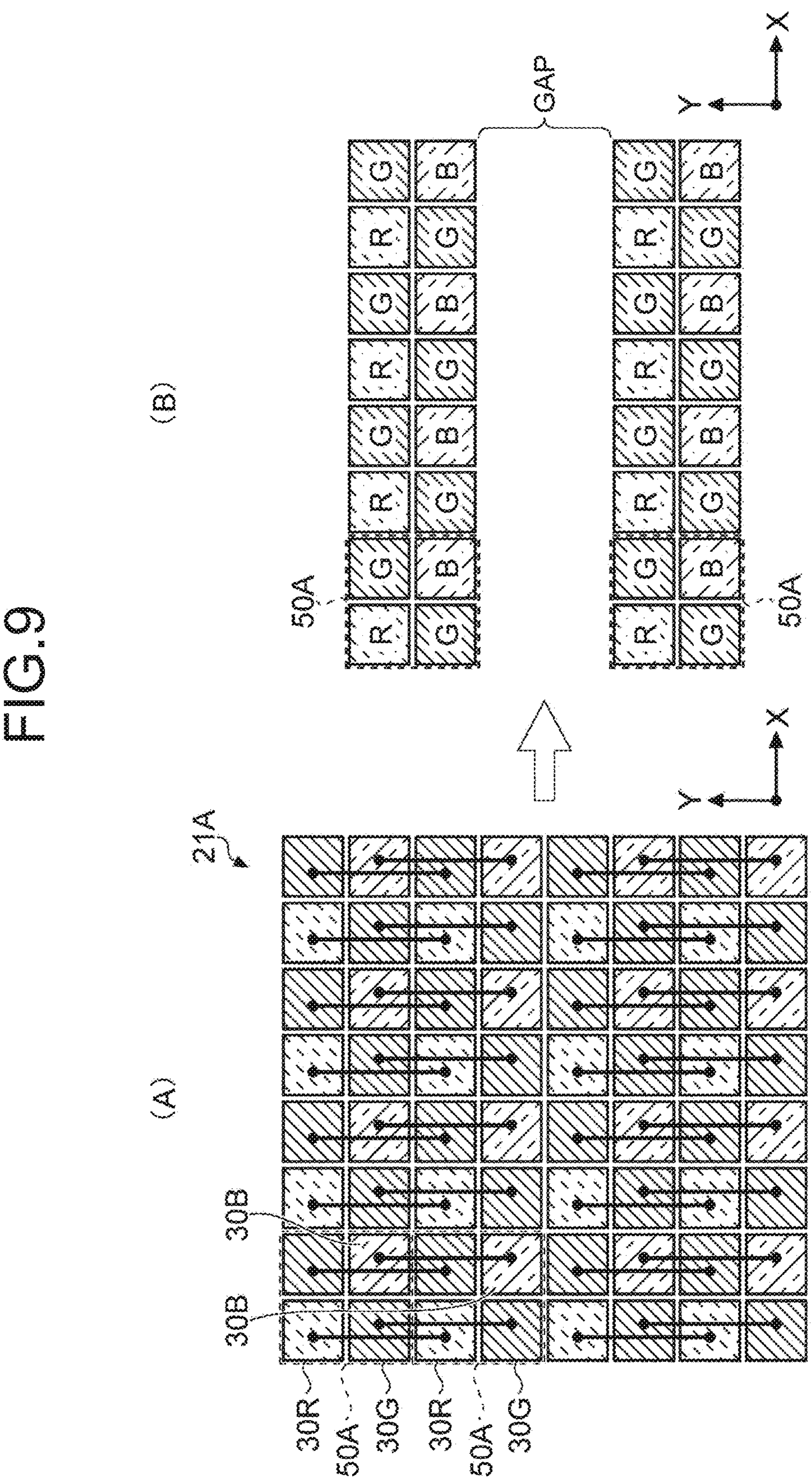
FIG. 9 is a diagram illustrating pixel addition in a conventional image sensor adopting a Bayer array.

FIG. 9 is a diagram illustrating pixel addition in a conventional image sensor adopting the Bayer array. Here, the pixel addition has constraints such as, for example, that addition needs to be performed in the pixels of the same color and that addition needs to be performed in pixels in the same basic unit 50A or in adjacent basic units 50A in order to suppress image quality degradation. Accordingly, as illustrated in FIG. 9(A), the conventional image sensor adopting the Bayer array typically performs addition of pixels of the same color arrayed at every other pixel in the vertical direction (also referred to as the column direction).

However, in a case of adding the pixels of the same color arrayed every other pixel in the vertical direction, the spatial coordinates of the read pixels become an average value of the added pixels 30 as illustrated in FIG. 9(B). Therefore, a gap occurs between the pixels of the same color in the vertical direction (column direction), leading to occurrence of non-uniformity of the spatial frequency of the pixels of the same color between the vertical direction and the horizontal direction. As a result, jaggies or the like occur in the output image, leading to a problem of image quality degradation. In addition, an image with degraded image quality due to jaggies or the like can cause a problem such as degradation of recognition processing accuracy.

1.8 Suppression of Image Quality Degradation

Figure 10:
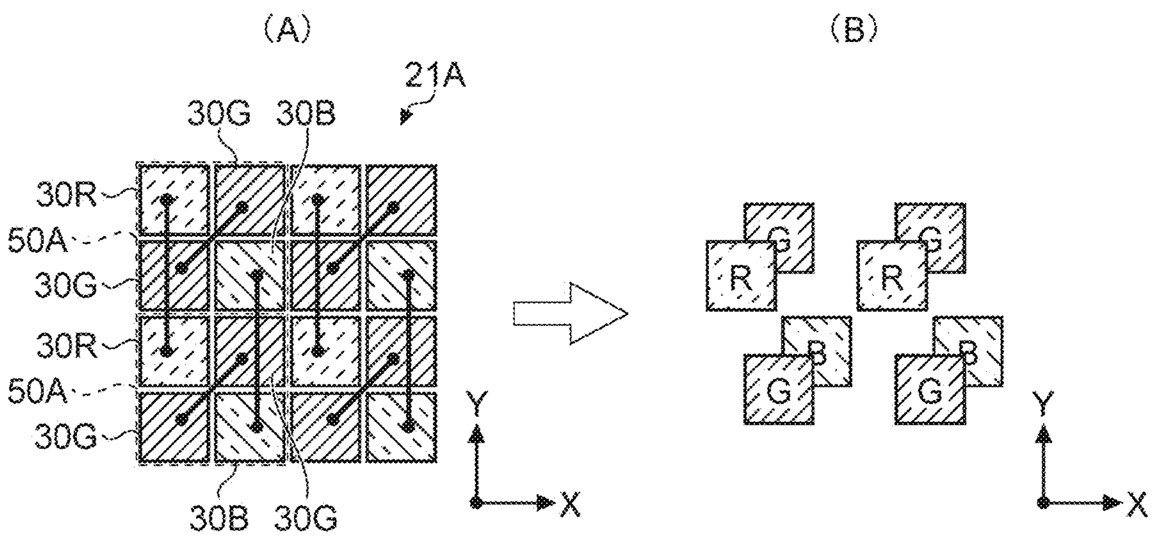
FIG. 10 is a diagram illustrating an example of combination of pixels to be added according to the first embodiment of the present disclosure.

To handle this, the present embodiment uses an enhanced technique in combining the pixels 30 to be added, thereby suppressing occurrence of non-uniformity in the spatial frequency of the pixels after the addition. FIG. 10 is a diagram illustrating an example of combination of pixels to be added according to the present embodiment. As illustrated in FIG. 10(A), in the present embodiment, at least the G pixel 30G, among the R pixel 30R, the G pixel 30G, and the B pixel 30B, undergoes addition, that is, the diagonally adjacent G pixels 30G in the basic unit 50A are added to each other. This makes it possible, as illustrated in FIG. 10(B), to achieve uniform spatial frequency of the pixel added and read from the G pixel 30G between the vertical direction and the horizontal direction, leading to suppression of image quality degradation due to jaggies or the like.

Furthermore, demosaic or remosaic processing usually includes processing of generating all RGB pixels while complementing the G pixels. However, by using, as in the present embodiment, an enhanced technique in combining pixels to be added so as to achieve uniformity in the spatial frequencies of the G pixels between the vertical direction and the horizontal direction, it is possible to omit the above-described processing. Also in the Bayer array, a reduced image having very good characteristics can be acquired.

Although FIG. 10 is an exemplary case of adding two pixels, the number of pixels to be added is not limited thereto. Even in a case where three or more pixels are added, it is also preferable to adjust the combination of pixels to be added for at least one color component pixel among the R pixel 30R, the G pixel 30G, and the B pixel 30B such that the spatial frequency after addition in the vertical direction and the horizontal direction is to be uniform or substantially uniform.

Figure 11:
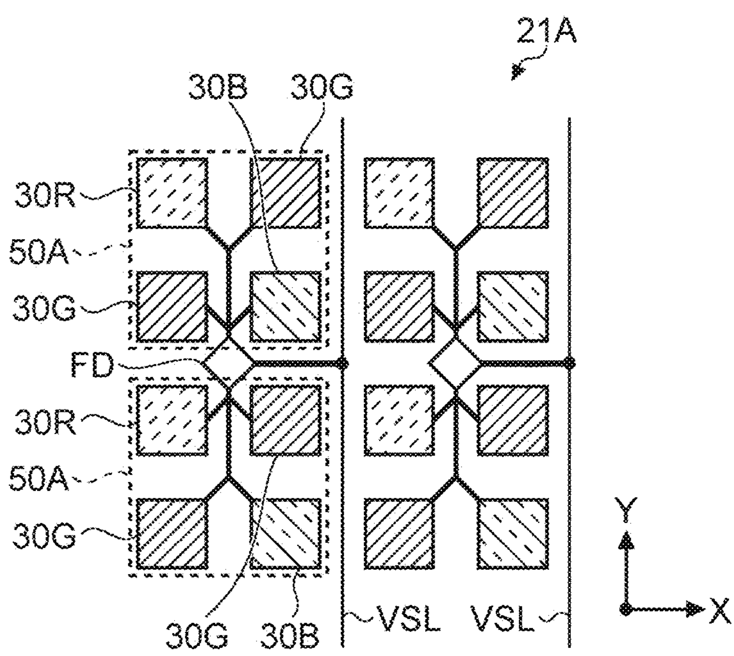
FIG. 11 is a diagram illustrating an example of pixel addition in the case of an 8-pixel sharing structure.
Figure 12:
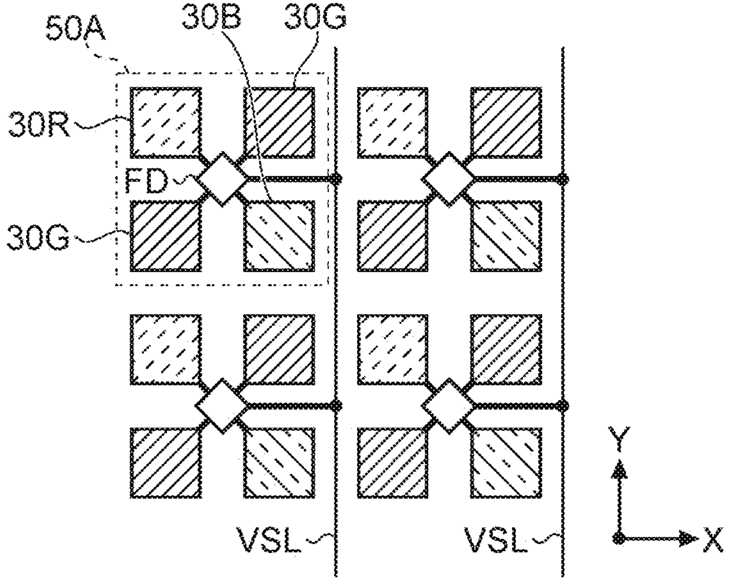
FIG. 12 is a diagram illustrating an example of pixel addition in a case of a 4-pixel sharing structure.

However, in order to perform addition of pixels, the floating diffusion region FD needs to be shared between the pixels 30 to be added. For example, it is possible to combine the pixels to be added as illustrated in FIG. 10 in a case where one floating diffusion region FD is shared by a total of eight pixels 30 constituting two basic units 50A arrayed in the vertical direction as illustrated in FIG. 11. However, in a case where one floating diffusion region FD is shared by a total of four pixels 30 constituting one basic unit 50A as illustrated in FIG. 12, it is not possible to combine the R pixel 30R and the B pixel 30B arrayed every other pixel in the vertical direction as pixels to be added.

Figure 13:
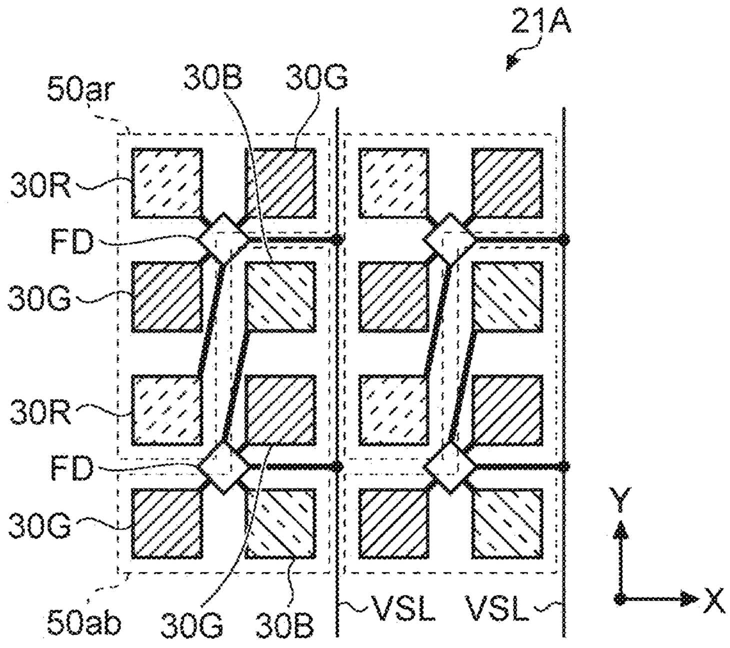
FIG. 13 is a diagram illustrating a configuration example of a sharing unit according to the first embodiment of the present disclosure.

To handle this, the present embodiment uses a configuration, as illustrated in FIG. 13, in which one floating diffusion region FD is shared by a total of four pixels 30 including three pixels 30 arrayed in the vertical direction and one pixel 30 adjacent in the horizontal direction to the pixel 30 located at one end of the three pixels 30 (hereinafter, the four pixels are also referred to as four pixels 30 arrayed in an L shape.) In the following description, a set of pixels 30 sharing the same single floating diffusion region FD is also referred to as a sharing unit.

Such a sharing structure constitutes: a sharing unit 50*ar* in which two R pixels 30R and two G pixels 30G arrayed in an L shape share one floating diffusion region FD; and a sharing unit 50*ab* in which two B pixels 30B and two G pixels 30G arrayed in an L shape share one floating diffusion region FD.

In this manner, with the sharing units 50*ar* and 50*ab* constituted by the three pixels 30 arrayed in the vertical direction and one pixel 30 adjacent in the horizontal direction to the pixel 30 located at one end of the three pixels 30, it is possible to achieve a combination of pixels of the same color (R pixel 30R or B pixel 30B) arrayed every other pixel in the vertical direction and a combination of pixels of the same color (G pixel 30G) diagonally adjacent to each other. This makes it possible to achieve a combination of pixels to be added as an example illustrated using FIG. 10.

In addition, floating diffusion region FD capacitance (FD capacitance) $C_{FD}$ is proportional to a wiring length (FD wiring length) constituting the floating diffusion region FD as expressed by the following Formula (1). Moreover, a conversion efficiency μ when the floating diffusion region FD converts electric charge into voltage is inversely proportional to the FD capacitance $C_{FD}$ as expressed by the following Formula (2). In the Formula (2), q is an elementary charge.

$$FD \text{ capacitance } C_{FD} \propto FD \text{ wiring length} \quad (1)$$

$$\text{Conversion efficiency } \mu = q/C_{FD} \quad (2)$$

Accordingly, the conversion efficiency μ can be increased with a shorter FD wiring length. In this regard, as illustrated in FIG. 13, by adopting a structure in which the floating diffusion region FD is disposed at the inner corner in the L-shaped pixel array, in other words, by disposing the floating diffusion region FD between the pixels to be added, arrayed in the diagonal direction (in the present example, between the G pixels 30G), the wiring length connecting the floating diffusion region FD to the transfer transistor 31 of each pixel 30 can be shortened to the same extent as the normal FD sharing structure of 2×2 pixels illustrated in FIG. 12. This makes it possible to maintain high conversion efficiency μ, and thus, it is also possible to suppress image quality degradation due to a decrease in conversion efficiency μ.

1.9 Remosaicing of Pixel Array

However, as illustrated in FIG. 14(A), in a case where the floating diffusion region FD is shared by the four pixels 30 arrayed in an L shape, and when readout of image data is executed using a drive system similar to the drive system for the pixel array section 21A using the Bayer array, the four pixels 30 arrayed in an L shape are read out as a basic unit of the Bayer array arrayed in a 2×2 pattern as illustrated in FIG. 14(B).

To handle this, in the present embodiment, as illustrated in FIG. 14(C), it is allowable, in the read image data, to execute remosaic processing of exchanging the R pixel 30R being #4 pixel in the sharing unit 50*ar* including two R pixels 30R and the B pixel 30B being #1 pixel in the sharing unit 50*ab* including two B pixels 30B. With this processing, the R pixels, the G pixels, and the B pixels in the image data can be arranged in a Bayer array, it is possible to use ordinary processing for Bayer arrays in a latter stage.

Figure 15:
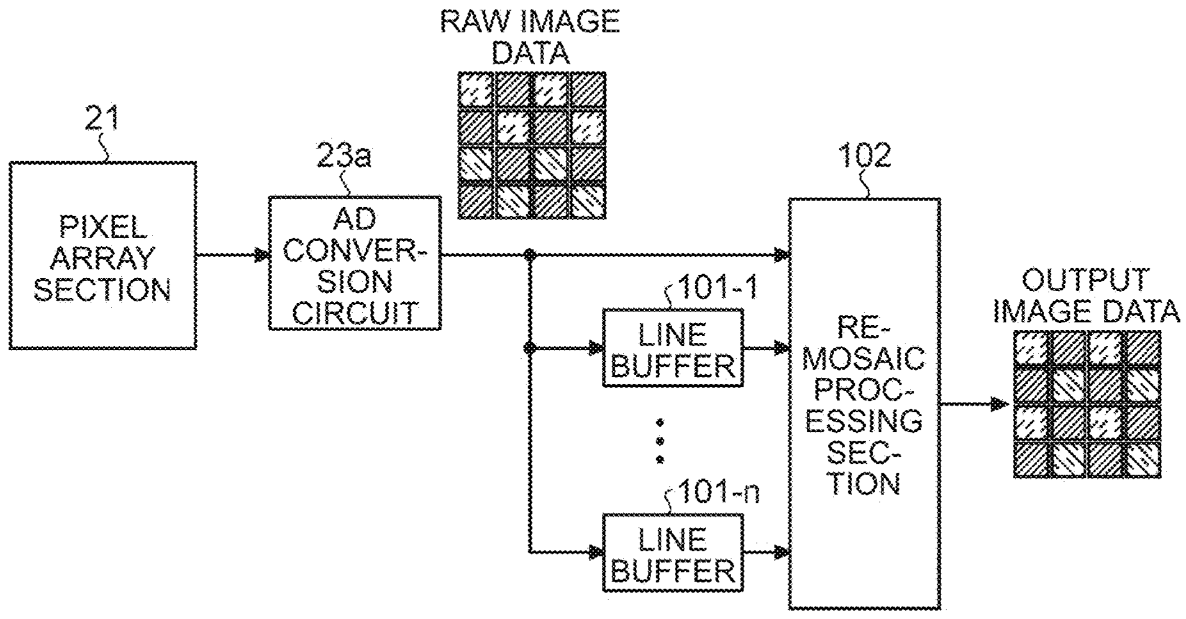
FIG. 15 is a block diagram illustrating a configuration for executing remosaic processing according to the first embodiment of the present disclosure.

FIG. 15 is a block diagram illustrating a configuration for executing the remosaic processing according to the present embodiment. As illustrated in FIG. 15, RAW image data read from the pixel array section 21 and subjected to AD conversion in an AD conversion circuit 23*a* of the column processing circuit 23 is input, line by line, to a remosaic processing section 102. At this time, line data including the pixel to be exchanged is temporarily stored in a line buffer 101-1, . . . , and 101-*n*, and then input to the remosaic processing section 102. The line data may represent image data for one line in the row direction.

Regarding the line data that does not include the pixel to be exchanged, the remosaic processing section 102 outputs the line data as it is in the original order. In contrast, the line data including the pixels to be exchanged are output by reading out the pixel values from the line buffers 101-1, . . . , and 101-*n* so as to be in the correct order.

This will be described using the example of FIG. 14. For convenience of description, line data in RAW image data will be defined: line data including pixel values of #1 and #2 of the sharing unit 50*ar* is defined as first line data; line data including pixel values of #3 and #4 of the sharing unit 50*ar* is defined as second line data; line data including pixel values of #1 and #2 of the sharing unit 50*ab* is defined as third line data; and line data including pixel values of #3 and #4 of the sharing unit 50*ab* is defined as the first line data.

Figure 14:
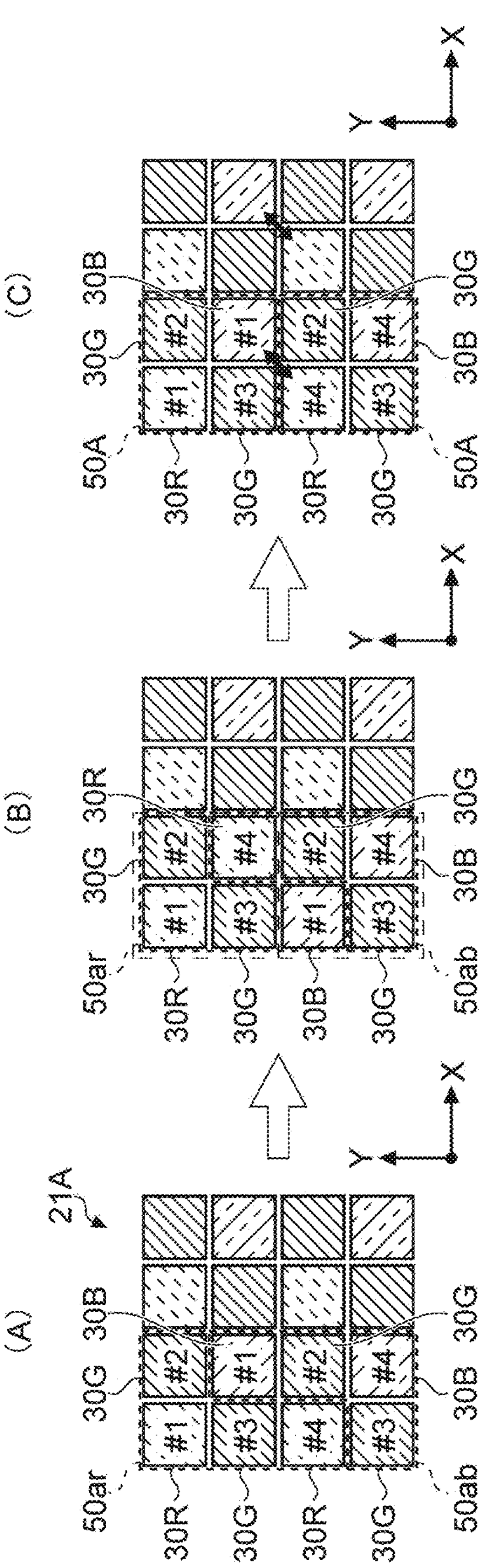
FIG. 14 is a diagram illustrating remosaic processing according to the first embodiment of the present disclosure.

FIG. 14 is an exemplary case where, in the RAW image data, a B pixel 30B (#1) to be located at the lower right of the basic unit 50A is replaced with an R pixel 30R (#4) to be located at the upper left of the basic unit 50A located at the lower side of the basic unit 50A in the vertical direction, in other words, a case where the R pixel #4 of the second line data and the B pixel #1 of the third line data are exchanged with each other (refer to FIG. 14(B)).

In the case of the example illustrated in FIG. 14, first, the first line data read from the pixel array section 21A and subjected to AD conversion is output as it is via the remosaic processing section 102. Next, the second line data including the pixel to be replaced is temporarily stored in the line buffer 101-1, and the third line data including the pixel to be replaced is temporarily stored in the line buffer 101-2. Subsequently, the remosaic processing section 102 reads the line data of two rows so as to be in the correct pixel order from the second line data and the third line data respectively stored in the line buffers 101-1 and 101-2, and sequentially outputs the read line data. The remosaic processing section 102 outputs the fourth line data input next as it is. With this processing, the pixel array of the output image data can be arranged in a correct Bayer array.

Note that this remosaic processing may be executed, for example, in the column processing circuit 23, in the signal processing section 26, or in the processor 13 outside the image sensor 10, for example. However, in a case where the pixel array section 21A is driven to allow the pixel array in the image data read from the pixel array section 21A to be a normal Bayer array, the remosaic processing described above may be omitted.

1.10 Correction of Inter-Pixel Characteristic Difference

As illustrated in FIG. 13, in a case where the floating diffusion region FD is disposed at an inner corner in the L-shaped pixel array, one pixel (for example, the lower left R pixel 30R in the sharing unit 50*ar*) of the four pixels 30 has a distance to the floating diffusion region FD different from the distance to the floating diffusion region FD from the other pixels 30. Therefore, even in the pixels 30 of the same color included in the same sharing unit 50*ar* or 50*ab*, there is a possibility of occurrence of a characteristic difference between the pixels. Accordingly, the present embodiment may implement processing of correcting the characteristic difference between the same-color pixels that has occurred in this manner.

Figure 16:
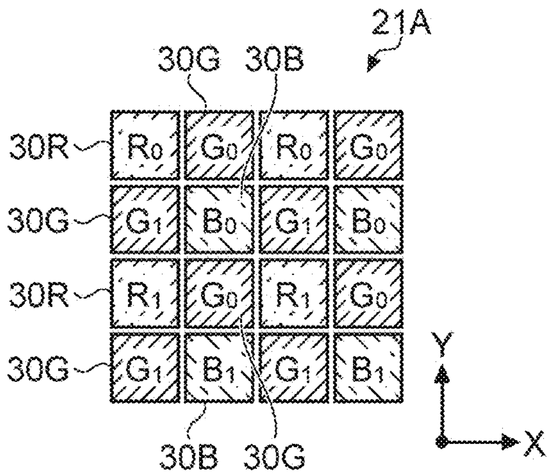
FIG. 16 is a diagram illustrating correction processing according to the first embodiment of the present disclosure.

Assumable examples of correction processing of the characteristic difference between the pixels of the same color include processing of correcting a sensitivity difference between the pixels and processing of correcting a color mixing difference due to an influence from surrounding pixels. Hereinafter, an example of correction processing will be described with reference to FIG. 16. For clarity, in the description using FIG. 16, the R pixel 30R is referred to as a pixel $R_0$ or a pixel $R_1$, the G pixel 30G is referred to as a pixel $G_0$ or a pixel $G_1$, and the B pixel 30B is referred to as a pixel $B_0$ or a pixel $B_1$.

The processing of correcting the sensitivity difference between the pixels may be, for example, processing of correcting the pixel value of the pixel 30 of the same color with a different phase by multiplying the pixel value by the gain. For example, correction processing as illustrated in the following Formulas (3) and (4) may be executed with definitions regarding the pixel $R_0$, specifically, the pixel value (RAW data) read from the pixel $R_0$ defined as $R_0$, the corrected pixel value $R_0$ defined as $R_0'$, and a correction gain coefficient for the pixel value $R_0$ defined as $g_{R0}$, and with definitions regarding the pixel $R_1$, specifically, the pixel value (RAW data) read from the pixel $R_1$ defined as $R_1$, the corrected pixel value $R_1$ defined as $R_1'$, and a correction gain coefficient for the pixel value $R_1$ defined as $g_{R1}$. This correction processing may be similarly performed for the pixels $B_0$, $B_1$, $G_0$, and $G_1$.

$$R_0' = R_0 \times g_{R0} \tag{3}$$

$$R_1' = R_1 \times g_{R1} \tag{4}$$

The process of correcting the color mixing difference due to the influence from the surrounding pixels may be performed as correction processing using the pixel values of the surrounding pixels 30, for example. For example, correction processing as illustrated in the following Formulas (5) and (6) may be executed with a pixel value (RAW data) read from the pixel $G_0$ defined as $G_0$, a corrected pixel value $G_0$ defined as $G_0'$, a pixel value (RAW data) read from the pixel $G_1$ defined as $G_1$, a corrected pixel value $G_1$ defined as $G_1'$, a color mixing correction coefficient across the pixel $G_0$ and the pixel $R_0$ defined as $C_{G0R0}$, a color mixing correction coefficient across the pixel $G_0$ and the pixel $B_1$ defined as $C_{G0B1}$, a color mixing correction coefficient across the pixel $G_1$ and the pixel $R_0$ defined as $C_{G1R0}$, and a color mixing correction coefficient across the pixel $G_1$ and the pixel $B_0$ defined as $C_{G1B0}$.

$$G_0' = G_0 - (R_0 \times C_{G0R0} + B_0 \times C_{G0B0} + B_1 \times C_{G0B1}) \tag{5}$$

$$G_1' = G_1 - (R_0 \times C_{G1R0} + R_1 \times C_{G1R0} + B_0 \times C_{G1B0}) \tag{6}$$

Execution of the correction processing as described above enables reduction of the characteristic difference between the pixels of the same color, making it possible to further suppress image quality degradation. Note that this correction processing may be executed by the column processing circuit 23 or may be executed by the signal processing section 26.

1.11 Application to Global Shutter System

The above has described an example of the rolling shutter system, being a system of reading a pixel value (line data) for each line in the horizontal direction, as a drive system of the image sensor 10. However, the drive system is not limited thereto, and it is also allowable to adopt a global shutter system of simultaneously driving all the pixels 30, for example.

Figure 17:
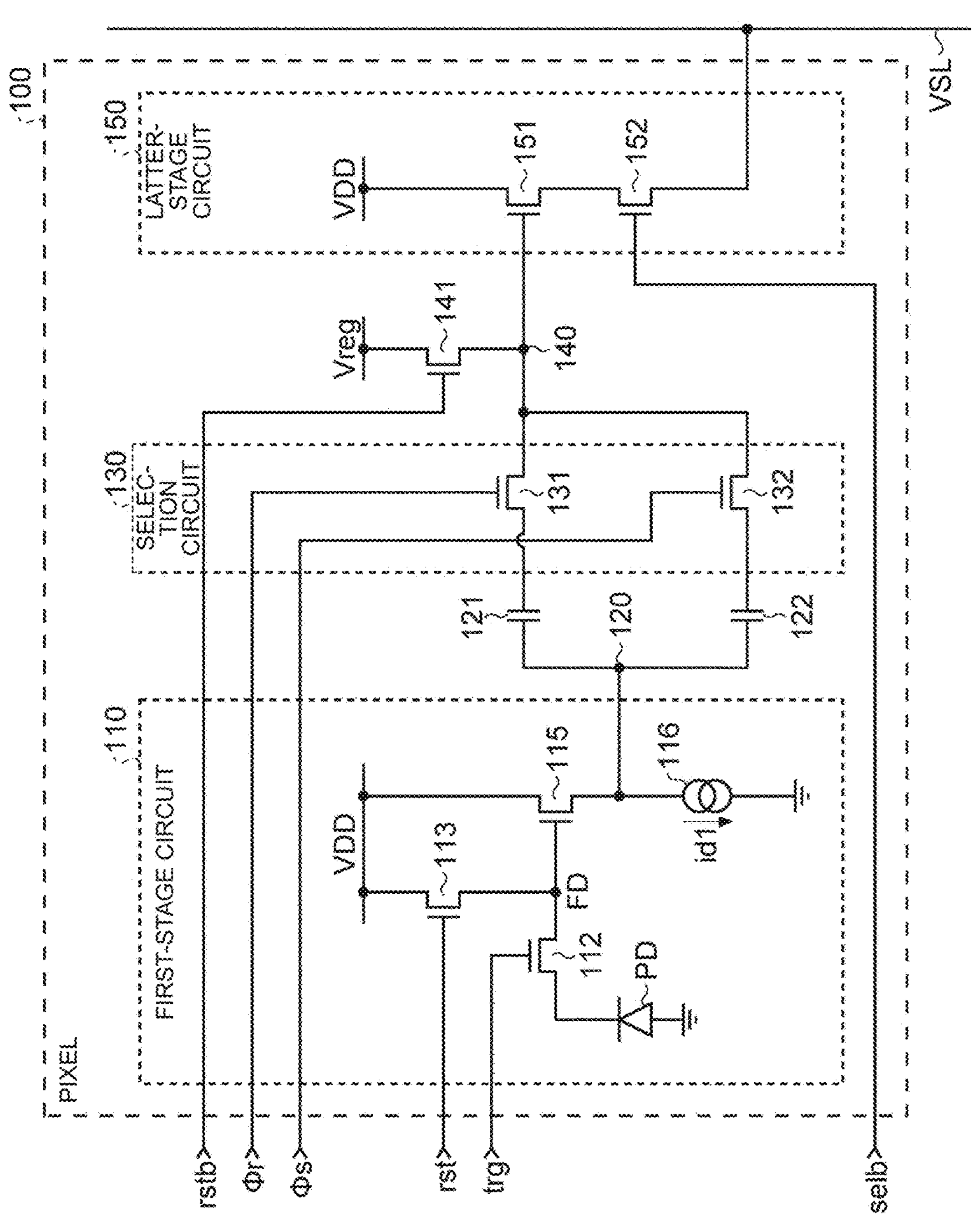
FIG. 17 is a circuit diagram illustrating a schematic configuration example of a pixel adopting a Voltage Domain Global Shutter (VDGS) system which is one of global shutter systems according to the first embodiment of the present disclosure.

FIG. 17 is a circuit diagram illustrating a schematic configuration example of a pixel 100 adopting a Voltage Domain Global Shutter (VDGS) system which is one of global shutter systems. As illustrated in FIG. 3, the pixel 100 includes a first-stage circuit 110, capacitive elements 121 and 122, a selection circuit 130, a latter-stage reset transistor 141, and a latter-stage circuit 150. In this configuration, the latter-stage reset transistor 141 and the latter-stage circuit 150 can be shared by a plurality of pixels 100.

The first-stage circuit 110 includes a photoelectric conversion section PD, a transfer transistor 112, a floating diffusion (FD) reset transistor 113, a floating diffusion region FD, a first-stage amplification transistor 115, and a current source transistor 116.

The photoelectric conversion section PD generates a charge by photoelectric conversion. The transfer transistor 112 transfers a charge from the photoelectric conversion section PD to the floating diffusion region FD in accordance with a transfer signal trg from a vertical scanning circuit 211.

The FD reset transistor 113 extracts and initializes charges from the floating diffusion region FD in accordance with a FD reset signal rst from the vertical scanning circuit 211. The floating diffusion region FD accumulates charges and generates a voltage corresponding to the charge amount. The first-stage amplification transistor 115 amplifies the level of the voltage of the floating diffusion region FD and outputs the amplified voltage to the first-stage node 120.

Sources of the FD reset transistor 113 and the first-stage amplification transistor 115 are connected to a power supply voltage VDD. The current source transistor 116 is connected to the drain of the first-stage amplification transistor 115. The current source transistor 116 supplies a current id1 under the control of the vertical scanning circuit 211.

Each of the capacitive elements 121 and 122 has its one end connected to the same first-stage node 120 provided as a node in common, and has the other end individually connected to the selection circuit 130.

The selection circuit 130 includes a selection transistor 131 and a selection transistor 132. The selection transistor 131 opens and closes a path between the capacitive element 121 and the latter-stage node 140 in accordance with a selection signal Φr from the vertical scanning circuit 211. The selection transistor 132 opens and closes a path between the capacitive element 122 and the latter-stage node 140 in accordance with a selection signal Φs from the vertical scanning circuit 211.

The latter-stage reset transistor 141 initializes the level of the latter-stage node 140 to a predetermined potential Vreg in accordance with a latter-stage reset signal rstb from the vertical scanning circuit 211. The potential Vreg is set to a potential different from the power supply potential VDD (for example, set to a potential lower than VDD).

The latter-stage circuit 150 includes a latter-stage amplification transistor 151 and a latter-stage selection transistor 152. The latter-stage amplification transistor 151 amplifies the level of the latter-stage node 140. The latter-stage selection transistor 152 outputs a signal at a level amplified by the latter-stage amplification transistor 151 to the vertical signal line VSL as a pixel signal in accordance with a latter-stage selection signal selb from the vertical scanning circuit 211.

Note that, for example, n-channel metal oxide semiconductor (nMOS) transistors are used as various transistors (transfer transistors 112 and the like) in the pixel 100.

The vertical scanning circuit 211 supplies the FD reset signal rst and the transfer signal trg, which are high level signals, to all the pixels at the start of exposure. This initializes the photoelectric conversion section PD. Hereinafter, this control is referred to as "PD reset".

Immediately before the end of the exposure, the vertical scanning circuit 211 supplies the high-level FD reset signal rst over the pulse period while setting the latter-stage reset signal rstb and the selection signal Φr to high levels for all the pixels. With this operation, the floating diffusion region FD is initialized, and a level corresponding to the level of the floating diffusion region FD at that time is held in the capacitive element 121. This control is hereinafter referred to as "FD reset".

The level of the floating diffusion region FD at the time of the FD reset and the level (a holding level of capacitive element 121 and a level of the vertical signal line VSL) corresponding to the FD level are hereinafter collectively referred to as a "P-phase" or a "reset level".

At the end of the exposure, the vertical scanning circuit 211 supplies the high-level transfer signal trg over the pulse period while setting the latter-stage reset signal rstb and the selection signal Φs to high levels for all the pixels. With this operation, signal charges corresponding to the exposure amount are transferred to the floating diffusion region FD, and a level corresponding to the level of the floating diffusion region FD at that time is held in the capacitive element 122.

The level of the floating diffusion region FD at the time of signal charge transfer and the level (a holding level of the capacitive element 122 and the level of the vertical signal line VSL) corresponding to the FD level are hereinafter collectively referred to as a "D-phase" or a "signal level".

The exposure control of simultaneously starting and ending the exposure for all the pixels in this manner is referred to as a global shutter system. Under the exposure control, the first-stage circuit 110 of all the pixels sequentially generates the reset level and the signal level. The reset level is held in the capacitive element 121, and the signal level is held in the capacitive element 122.

After completion of the exposure, the vertical scanning circuit 211 sequentially selects a row and sequentially outputs a reset level and a signal level of the row. When outputting the reset level, the vertical scanning circuit 211 supplies the high-level selection signal Φr over a predetermined period while setting the FD reset signal rst and the latter-stage selection signal selb of the selected row to high levels. With this operation, the capacitive element 121 is connected to the latter-stage node 140, and the reset level is read.

After readout of the reset level, the vertical scanning circuit 211 supplies the high-level latter-stage reset signal rstb over the pulse period while keeping the FD reset signal rst and the latter-stage selection signal selb of the selected row at high levels. This initializes the level of the latter-stage node 140. At this time, both the selection transistor 131 and the selection transistor 132 are in the open state, disconnecting the capacitive elements 121 and 122 from the latter-stage node 140.

After initialization of the latter-stage node 140, the vertical scanning circuit 211 supplies a high-level selection signal Φs over a predetermined period while keeping the FD reset signal rst and the latter-stage selection signal selb of the selected row at high levels.

With this operation, the capacitive element 122 is connected to the latter-stage node 140, and the signal level is read.

Under the above-described readout control, the selection circuit 130 of the selected row sequentially performs control to connect the capacitive element 121 to the latter-stage node 140, control to disconnect the capacitive elements 121 and 122 from the latter-stage node 140, and control to connect the capacitive element 122 to the latter-stage node 140. In addition, when the capacitive elements 121 and 122 are disconnected from the latter-stage node 140, the latter-stage reset transistor 141 of the selected row initializes the level of the latter-stage node 140. In addition, the latter-stage circuit 150 of the selected row sequentially reads the reset level and the signal level from the capacitive elements 121 and 122 via the latter-stage node 140, and outputs the reset level and the signal level to the vertical signal line VSL.

In the above configuration, for example, a light receiving circuit including the photoelectric conversion section PD, the transfer transistor 112, the FD reset transistor 113, and the first-stage amplification transistor 115 may be disposed on the light receiving chip 41, while a circuit configuration 302, being circuit configurations other than the light receiving circuit, may be disposed on the circuit chip 42.

In addition, the latter-stage reset transistor 141 and the latter-stage circuit 150 have a circuit configuration that does not affect the conversion efficiency μ changeable due to the floating diffusion region FD. Accordingly, in the present embodiment, the latter-stage reset transistor 141 and the latter-stage circuit 150 are shared by a plurality of pixels constituting the basic unit, and the wiring length in the shared portion is to be changed. This makes it possible to achieve a pixel sharing structure while maintaining the conversion efficiency μ of each pixel 100.

In the first-stage circuit 110, the wiring length from the drain of the transfer transistor 112 to the gate of the first-stage amplification transistor 115 and the source of the FD reset transistor 113 can affect the conversion efficiency μ by the floating diffusion region FD, and thus, it is preferable that these wiring lengths are the same among the pixels 100 sharing the same floating diffusion region FD.

Figure 18:
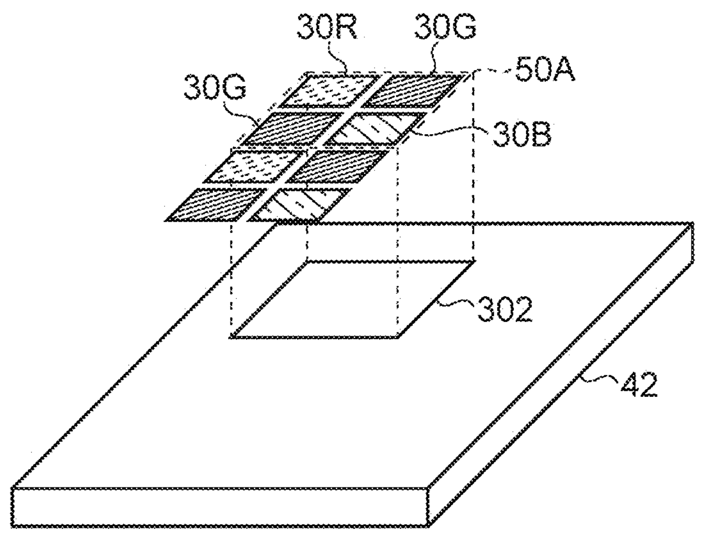
FIG. 18 is a diagram illustrating a circuit layout example in a case where pixel sharing is implemented by a basic unit of a Bayer array.
Figure 19:
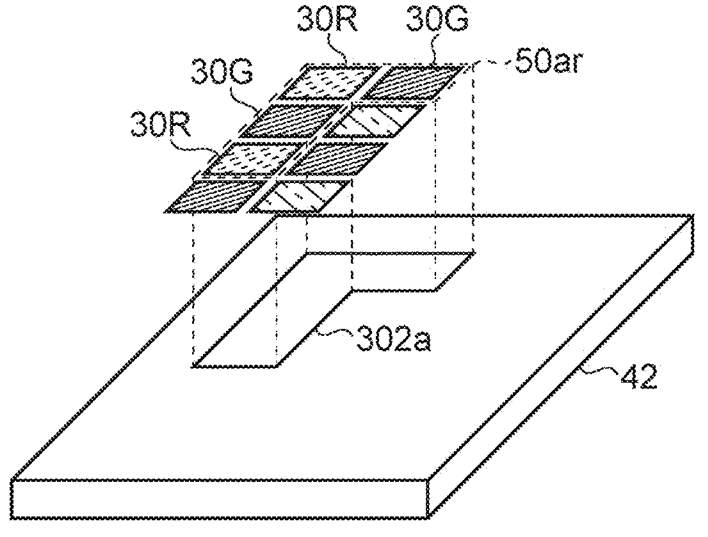
FIG. 19 is a diagram illustrating a circuit layout example in a case of implementing pixel sharing according to the first embodiment of the present disclosure.

In this manner, in the configuration that implements pixel sharing with the circuit configuration 302 disposed in the circuit chip 42, it is possible to perform a design change from a structure of implementing pixel sharing using the basic unit 50A in the Bayer array as illustrated in FIG. 18 to a structure of implementing pixel sharing using the sharing unit 50*ar* (or the sharing unit 50*ab*) arrayed in an L shape as illustrated in FIG. 19, that is, for example, a design change from the circuit configuration 302 laid out in a rectangular region to a circuit configuration 302*a* laid out in an L shape region, mainly by changing the wiring lengths of the latter-stage reset transistor 141 and the latter-stage circuit 150 not affecting the conversion efficiency μ. This makes it possible to achieve the design change by extremely facilitated operations while maintaining the conversion efficiency μ of each pixel 100.

1.12 Application to Other Color Filter Array

The pixel array shape of the sharing unit exemplified above is not limited to the L shape, and an optimal array shape is preferably to be adopted in consideration of a combination with the adopted color filter array. The following will describe an example of a pixel array shape in a case of adopting an RGBW array (W representing white) instead of the Bayer array.

Figure 20:
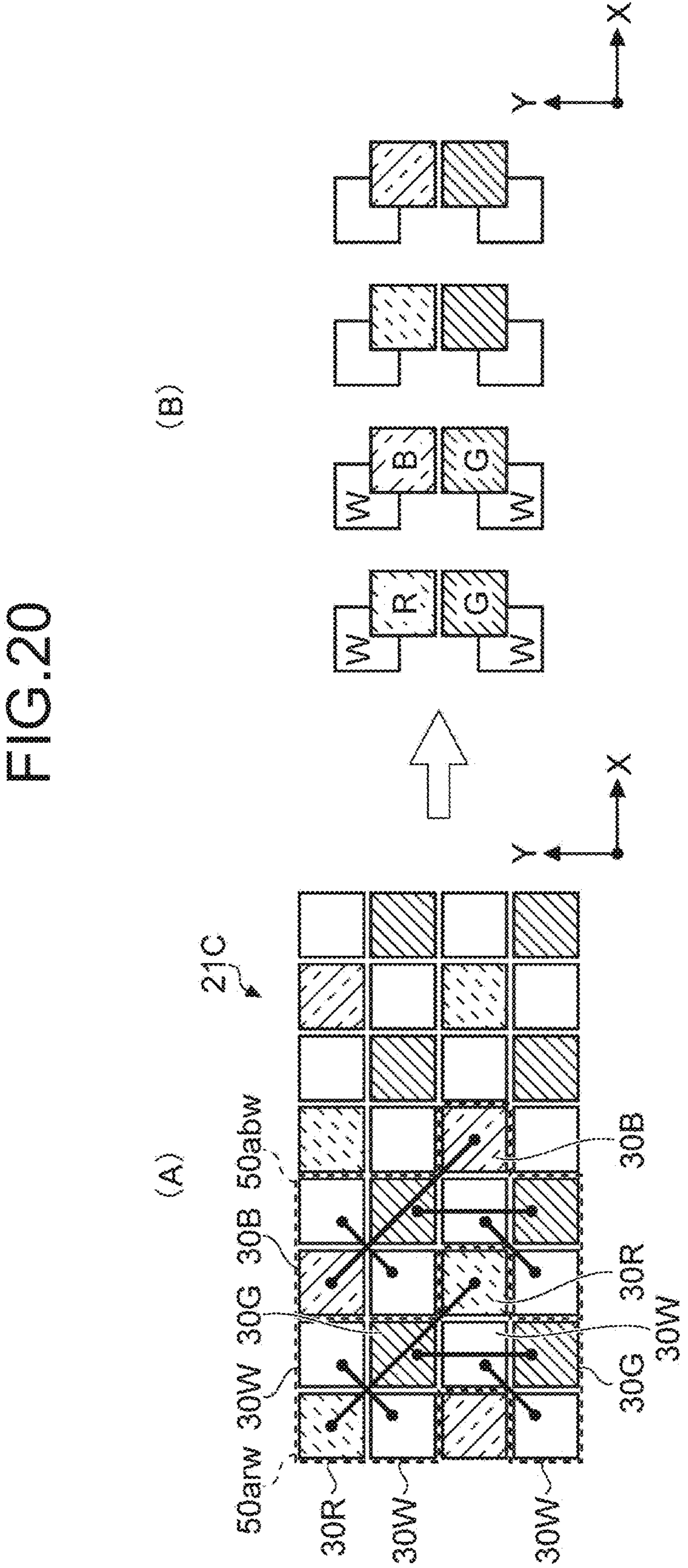
FIG. 20 is a diagram illustrating an example of a sharing unit applicable to an image sensor that adopts an RGBW array (W representing white) according to the first embodiment of the present disclosure.

FIG. 20 is a diagram illustrating an example of a sharing unit applicable to an image sensor that adopts an RGBW array (W representing white). As illustrated in FIG. 20(A), even when a W pixel 30W equipped with a color filter 52 having a broad transmission characteristic for the visible light region is disposed in addition to the R pixel 30R, the G pixel 30G, and the B pixel 30B, it is also possible to suppress image quality degradation by using an enhanced technique in combining pixels to be added so as to achieve uniform spatial frequency in the vertical direction and the horizontal direction for at least one of RGBW (in FIG. 20, other than G). For example, it is possible, in the example illustrated in FIG. 20(B), to achieve uniform spatial frequency in the vertical direction and the horizontal direction of each of the W pixel, the R pixel, and the B pixel.

1.13 Summary

As described above, according to the present embodiment, it is possible to achieve uniform spatial frequency in the vertical direction and the horizontal direction for at least one color component in the image data read from the pixel array section 21, making it possible to suppress the occurrence of jaggies and the like and to suppress image quality degradation.

2. Second Embodiment

Next, a second embodiment of the present disclosure will be described in detail with reference to the drawings. In the following description, the configurations operations and effects similar to those of the above-described embodiment will be cited, thereby omitting redundant description.

The first embodiment above has described the case of achieving uniform spatial frequency in the vertical direction and the horizontal direction for at least one color component in the image data by using an enhanced technique to adjust the pixel array of the sharing unit sharing the floating diffusion region FD, that is, the combination of the pixels to be added, thereby suppressing image quality degradation. In contrast, the second embodiment will describe a case of using an enhanced technique in configurations such as the pixel drive line LD, the pixel sharing structure (that is, the pixel array of the sharing unit), and the color filter array. This makes it possible to acquire image data that is suitable for the latter-stage processing and that has achieved uniform spatial frequency in the vertical direction and the horizontal direction for at least one color component in the image data, leading to suppression of image quality degradation.

In the present embodiment, the electronic device and the image sensor may be similar to those exemplified in the first embodiment. However, in the present embodiment, the color filter array and the pixel sharing structure are replaced with those exemplified below.

2.1 Example of Color Filter Array and Pixel Sharing Structure

Figure 21:
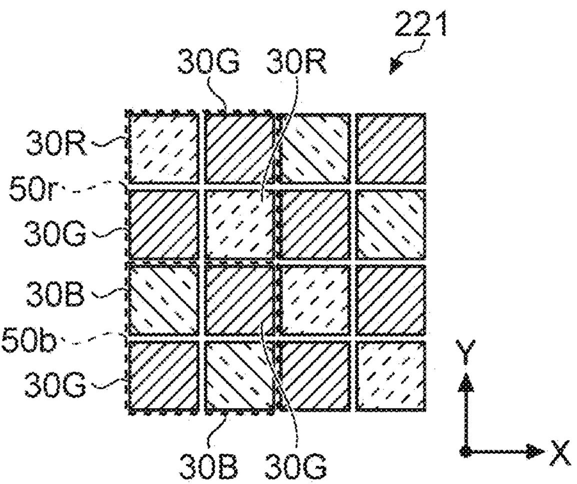
FIG. 21 is a plan view illustrating a pixel layout example that adopts a color filter array and a pixel sharing structure according to a second embodiment of the present disclosure.

FIG. 21 is a plan view illustrating a pixel layout example that adopts a color filter array and a pixel sharing structure according to the present embodiment. As illustrated in FIG. 21, a pixel array section 221 in the present embodiment has a pixel layout structure in which an R pixel 30R, a G pixel 30G, and a B pixel 30B are each arrayed in diagonal directions.

Figure 22:
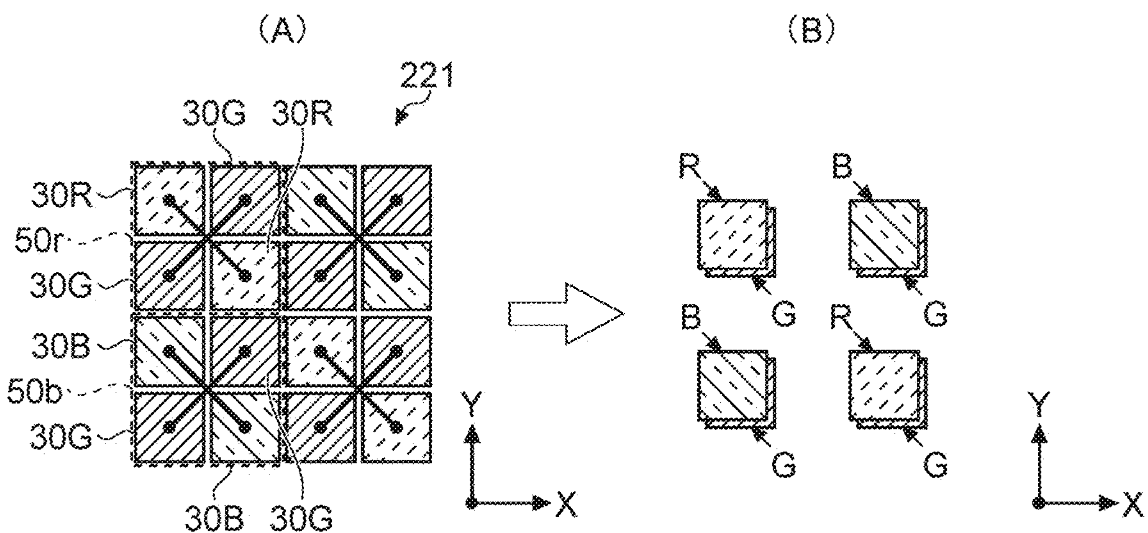
FIG. 22 is a diagram illustrating an example of combination of pixels to be added according to the second embodiment of the present disclosure.

In such a configuration, as illustrated in FIG. 22(A), there is provided a sharing unit including: a sharing unit 50*r* formed as a 2×2 pattern of two R pixels 30R arrayed in a direction diagonally downward to the right and two G pixels 30G arrayed in a direction diagonally upward to the right; and a sharing unit 50*b* formed as a 2×2 pattern of two B pixels 30B arrayed in a direction diagonally downward to the right and two G pixels 30G arrayed in a direction diagonally upward to the right.

In this manner, by combining the pixels of the same color positioned diagonally in the 2×2 pixel array as the pixels to be added, as illustrated in FIG. 22(B), it is possible to achieve uniform spatial frequency of each of the R pixel, the B pixel, and the G pixel after the addition in both the vertical direction and the horizontal direction, leading to suppression of image quality degradation due to jaggies and the like.

Furthermore, the present embodiment enables matching of the spatial coordinates after addition of the R pixel or the B pixel and the G pixel, making it possible to facilitate improvement of accuracy of pixel interpolation of the R pixel and the B pixel.

Furthermore, the present embodiment has a further advantage of successfully constructing the sharing units 50*r* and 50*b* without changing the wiring structure of the floating diffusion region FD.

Incidentally, in the case of all-pixel readout, the remosaic processing of the pixel array may be executed by the technique described with reference to FIGS. 14 and 15 so as to form the R pixels, the G pixels, and the B pixels in the image data in the Bayer array. However, the configuration is not limited thereto, and demosaic processing corresponding to the pixel array of the present example may be executed.

According to the present embodiment, it is possible to acquire image data having better quality in luminance and resolution than the quad Bayer array illustrated using FIG. 8 in the first embodiment. Furthermore, according to the present embodiment, the image quality after execution of pixel addition can be improved more than the image quality in a case of adopting the Bayer array or the quad Bayer array. In this manner, it is possible to suppress image quality degradation in both the all-pixel mode and the binning mode.

Since other configurations, operations, and effects may be similar to those in the above-described embodiment, detailed description will be omitted here.

2.2 Modification of Color Filter Array and Pixel Sharing Structure

Since the color filter array and the pixel sharing structure according to the second embodiment have high compatibility with a structure in which pixels arrayed in the diagonal direction are to be used as combination of pixels to be added, it is possible to adopt various color filter arrays in which pixels of the same color are arrayed in the diagonal direction. Therefore, in the following, modifications of the color filter array and the pixel sharing structure according to the second embodiment described above with reference to FIGS. 21 and 22 will be described with some examples. Configurations, operations, and effects not specifically mentioned in the following description may be similar to those of the above-described embodiment or other modifications.

2.2.1 First Modification

Figure 23:
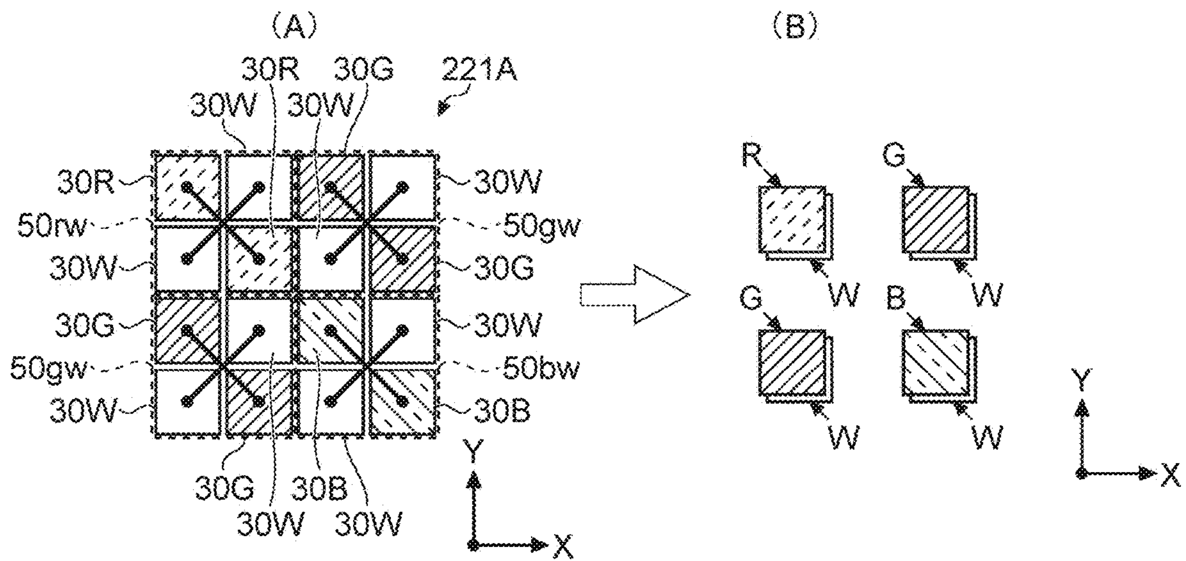
FIG. 23 is a plan view illustrating a pixel layout example adopting a color filter array and a pixel sharing structure according to a first modification of the second embodiment of the present disclosure.

FIG. 23 is a plan view illustrating a pixel layout example adopting a color filter array and a pixel sharing structure according to a first modification. As illustrated in FIG. 23(A), a pixel array section 221A according to the first modification has a pixel layout structure in which W pixels 30W, in addition to the R pixel 30R, the G pixel 30G, and the B pixel 30B, are each arrayed in diagonal directions.

In such a configuration, as illustrated in FIG. 23(A), there is provided a sharing unit including: a sharing unit 50*rw* formed as a 2×2 pattern of two R pixels 30R arrayed in a direction diagonally downward to the right and two W pixels 30W arrayed in a direction diagonally upward to the right; a sharing unit 50*gw* formed as a 2×2 pattern of two G pixels 30G arrayed in a direction diagonally downward to the right and two W pixels 30W arrayed in a direction diagonally upward to the right; and a sharing unit 50*bw* formed as a 2×2 pattern of two B pixels 30B arrayed in a direction diagonally downward to the right and two W pixels 30W arrayed in a direction diagonally upward to the right.

In this manner, even in a case of providing the W pixel 30W in addition to the R pixel 30R, G pixel 30G and the B pixel 30B, by combining the pixels of the same color positioned diagonally in the 2×2 pixel array as the pixels to be added, as illustrated in FIG. 23(B), it is possible to achieve uniform spatial frequency of each of the R pixel, the B pixel, the G pixel, and the W pixel after the addition in both the vertical direction and the horizontal direction. With this configuration, it is possible, similarly to the above-described embodiment, to suppress image quality degradation due to jaggies and the like.

2.2.2 Second Modification

Figure 24:
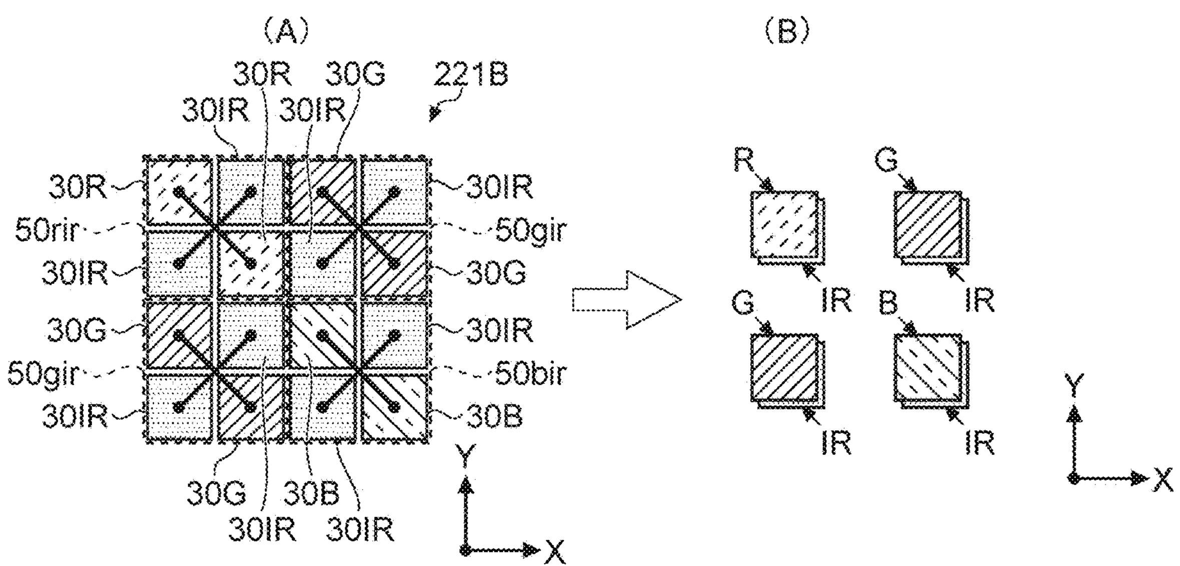
FIG. 24 is a plan view illustrating a pixel layout example adopting a color filter array and a pixel sharing structure according to a second modification of the second embodiment of the present disclosure.

FIG. 24 is a plan view illustrating a pixel layout example adopting a color filter array and a pixel sharing structure according to a second modification. As illustrated in FIG. 24(A), a pixel array section 221B according to the second modification has a pixel layout structure in which a W pixel 30W is replaced with an IR pixel 30IR provided with a color filter 52 having a transmission characteristic for infrared light (including near-infrared light) in a configuration similar to that of the pixel array section 221A described as the first modification.

Accordingly, as illustrated in FIG. 24(A), the pixel array section 221B of the present modification includes: a sharing unit 50*rir* formed as a 2×2 pattern of two R pixels 30R arrayed in a direction diagonally downward to the right and two IR pixels 30IR arrayed in a direction diagonally upward to the right; a sharing unit 50*gir* formed as a 2×2 pattern of two G pixels 30G arrayed in a direction diagonally downward to the right and two IR pixels 30IR arrayed in a direction diagonally upward to the right; and a sharing unit 50*bir* formed as a 2×2 pattern of two B pixels 30B arrayed in a direction diagonally downward to the right and two IR pixels 30IR arrayed in a direction diagonally upward to the right.

In this manner, even in a case of providing the IR pixel 30IR in addition to the R pixel 30R, G pixel 30G and the B pixel 30B, by combining the pixels of the same color positioned diagonally in the 2×2 pixel array as the pixels to be added, as illustrated in FIG. 24(B), it is possible to achieve uniform spatial frequency of each of the R pixel, the B pixel, the G pixel, and the IR pixel after the addition in both the vertical direction and the horizontal direction. With this configuration, it is possible, similarly to the above-described embodiment, to suppress image quality degradation due to jaggies and the like.

2.2.3 Third Modification

In cases where the W pixel 30W and the IR pixel 30IR are included in the pixel array section 21 in addition to the R pixel 30R, the G pixel 30G, and the B pixel 30B as in the first modification and the second modification described above, it is possible to suppress image quality degradation by achieving uniform spatial frequency in the vertical direction and the horizontal direction of at least the G pixel 30G, the W pixel 30W, or the IR pixel 30IR after addition of pixels. Therefore, for example, in a case where the sharing unit includes an m×n (each of m and n is an integer of 3 or more) pixel array as illustrated in FIGS. 25 to 28 (3×3 pixel array in the example of FIGS. 25 to 28), the pixel addition is not limited to the pixel addition of two pixels of the same color, and it is possible to perform various modifications such as pixel addition of four pixels of the same color or five pixels of the same color.

Figure 25:
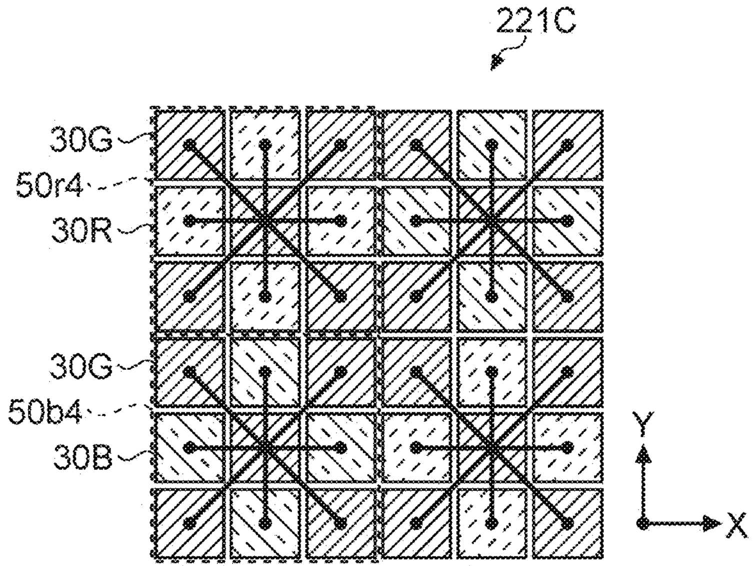
FIG. 25 is a plan view (part 1) illustrating a pixel layout example adopting a color filter array and a pixel sharing structure according to a third modification of the second embodiment of the present disclosure.

A pixel array section 221C illustrated in FIG. 25 includes: a sharing unit 50*r*4 as a 3×3 pattern including five G pixels 30G located at each of four corners and the center and four R pixels 30R located at the center of each of the four sides; and a sharing unit 50*b*4 as a 3×3 pattern including five G pixels 30G located at each of the four corners and the center and four B pixels 30B located at the center of each of the four sides.

Figure 26:
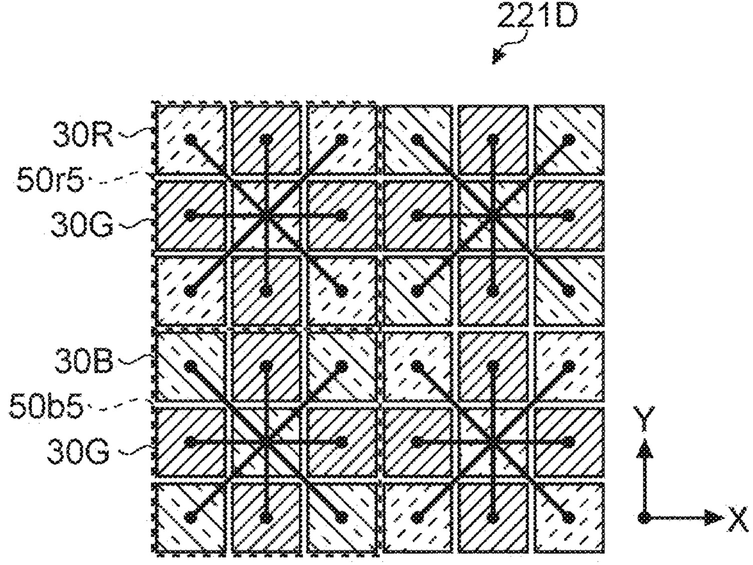
FIG. 26 is a plan view (part 2) illustrating a pixel layout example adopting the color filter array and the pixel sharing structure according to the third modification of the second embodiment of the present disclosure.

A pixel array section 221D illustrated in FIG. 26 includes: a sharing unit 50*r*5 as a 3×3 pattern including five R pixels 30R located at each of four corners and the center and four G pixels 30G located at the center of each of the four sides; and a sharing unit 50*b*5 as a 3×3 pattern including five B pixels 30B located at each of the four corners and the center and four G pixels 30G located at the center of each of the four sides.

Figure 27:
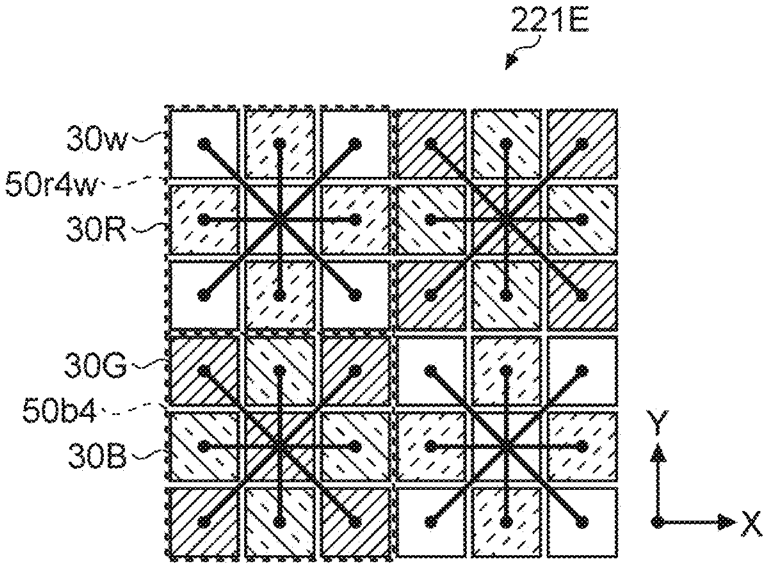
FIG. 27 is a plan view (part 3) illustrating a pixel layout example adopting the color filter array and the pixel sharing structure according to the third modification of the second embodiment of the present disclosure.

A pixel array section 221E illustrated in FIG. 27 includes: a sharing unit 50*r*4*w* as a 3×3 pattern including five W pixels 30W located at each of four corners and the center and four R pixels 30R located at the center of each of the four sides; and a sharing unit 50*b*4 as a 3×3 pattern including five G pixels 30G located at each of the four corners and the center and four B pixels 30B located at the center of each of the four sides.

Figure 28:
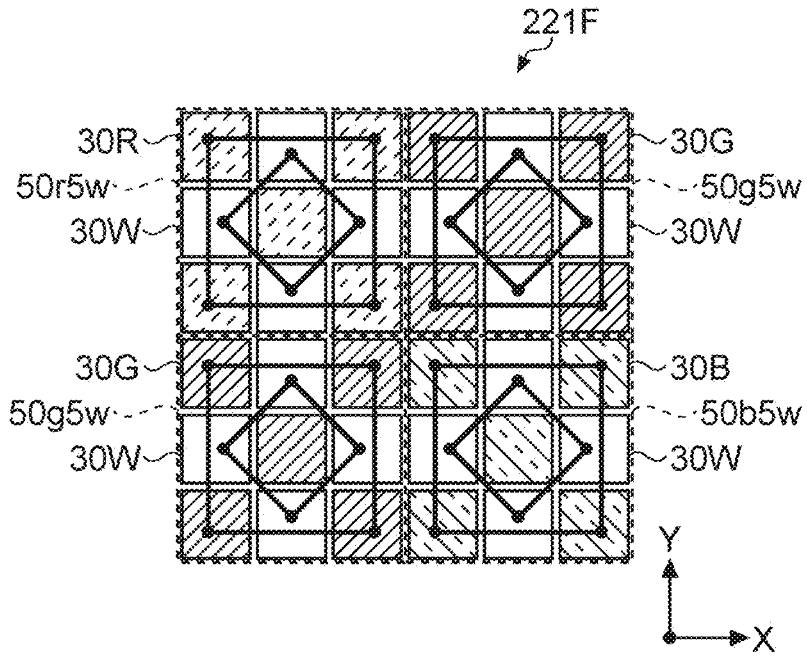
FIG. 28 is a plan view (part 4) illustrating a pixel layout example adopting the color filter array and the pixel sharing structure according to the third modification of the second embodiment of the present disclosure.

A pixel array section 221F illustrated in FIG. 28 includes: a sharing unit 50*r*5*w* as a 3×3 pattern including five R pixels 30R located at each of four corners and the center and four W pixels 30W located at the center of each of the four sides; a sharing unit 50*g*5*w* as a 3×3 pattern including five G pixels 30G located at each of the four corners and the center and four W pixels 30W located at the center of each of the four sides; and a sharing unit 50*b*5*w* as a 3×3 pattern including five B pixels 30B located at each of the four corners and the center and four W pixels 30W located at the center of each of the four sides.

In this manner, even in a case where the sharing unit includes m×n (each of m and n is an integer of 3 or more) pixel arrays, similarly to the above-described embodiment, it is possible to suppress image quality degradation due to jaggies and the like by achieving uniform spatial frequencies in the vertical direction and the horizontal direction of the pixel after addition for at least one wavelength component.

3. Third Embodiment

Next, a third embodiment of the present disclosure will be described in detail with reference to the drawings. In the following description, the configurations operations and effects similar to those of the above-described embodiment will be cited, thereby omitting redundant description.

As illustrated in FIG. 29, for example, in an image sensor adopting the rolling shutter system, shutter control is executed for each row. Specifically, using the pixel drive line (also referred to as a horizontal signal line) LD wired for each row in the row direction, timing control such as resetting (by reset signal) of the floating diffusion region FD (and the photoelectric conversion section PD) and readout (by selection signal) of the pixel signal is performed, thereby accumulating the charges in the floating diffusion region FD of the pixel 30.

Figure 30:
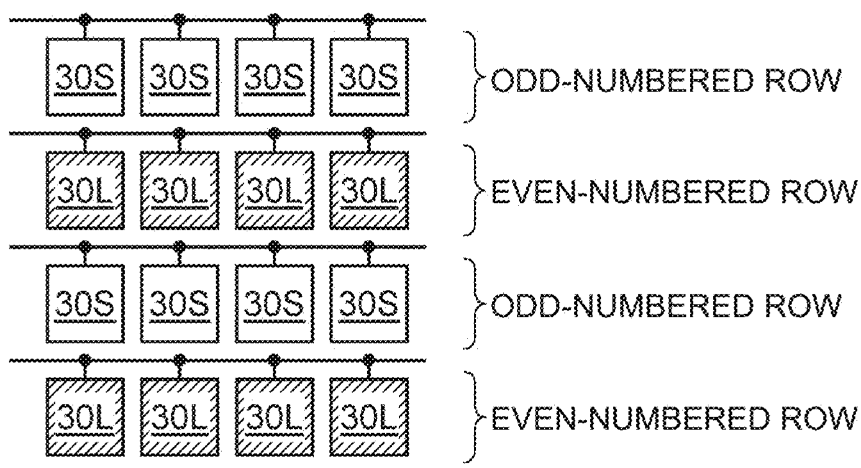
FIG. 30 is a diagram illustrating a connection example of pixel drive lines in an image sensor adopting a rolling shutter system.
Figure 31:
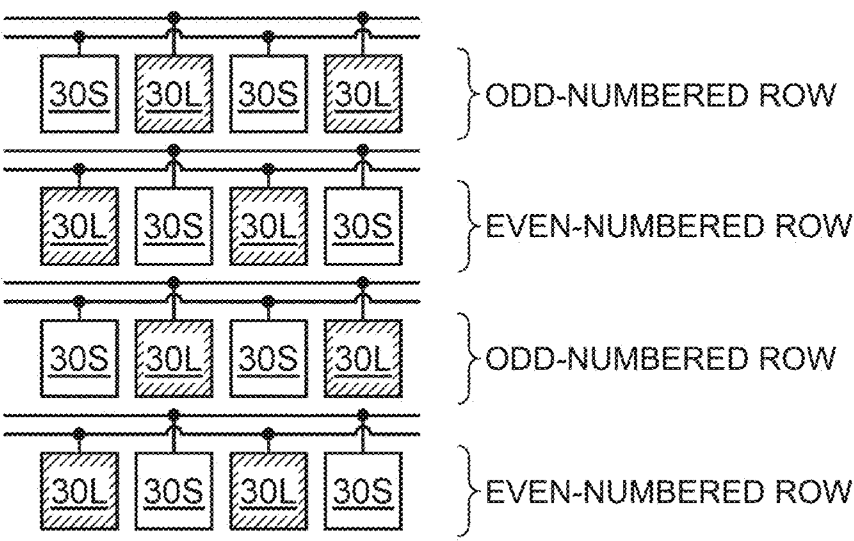
FIG. 31 is a diagram illustrating another connection example of pixel drive lines in an image sensor adopting a rolling shutter system.

With such a configuration, in a case where it is desired to perform High Dynamic Range (HDR) imaging or the like by changing the shutter time for each of the pixels 30, for example, there is a need to change control for each row such that pixels 30S having a short charge accumulation time (hereinafter, also referred to as a short charge accumulation pixel) are arrayed in odd-numbered rows (or even-numbered rows) and pixels having a long charge accumulation time (hereinafter, also referred to as a long charge accumulation pixel) 30L are arrayed in even-numbered rows (or odd-numbered rows) as illustrated in FIG. 30, or there is a need to increase the number of horizontal signal lines so as to provide separate pixel drive lines LD (for example, reset lines) individually for the short charge accumulation pixels 30S and the long charge accumulation pixels 30L as illustrated in FIG. 31.

Here, in a case of changing the control for each row, it is possible to simplify the wiring structure and the like. However, the resolution would be different between the horizontal direction and the vertical direction, leading to occurrence of jaggies and the like, causing image quality degradation. On the other hand, in a case of increasing the number of horizontal signal lines, it is possible to achieve uniform sampling in the horizontal direction and the vertical direction, leading to suppression of image quality degradation. However, this complicates the wiring structure and the like, causing a problem of difficulty in mounting the configuration on the image sensor capable of high resolution imaging.

Figure 32:
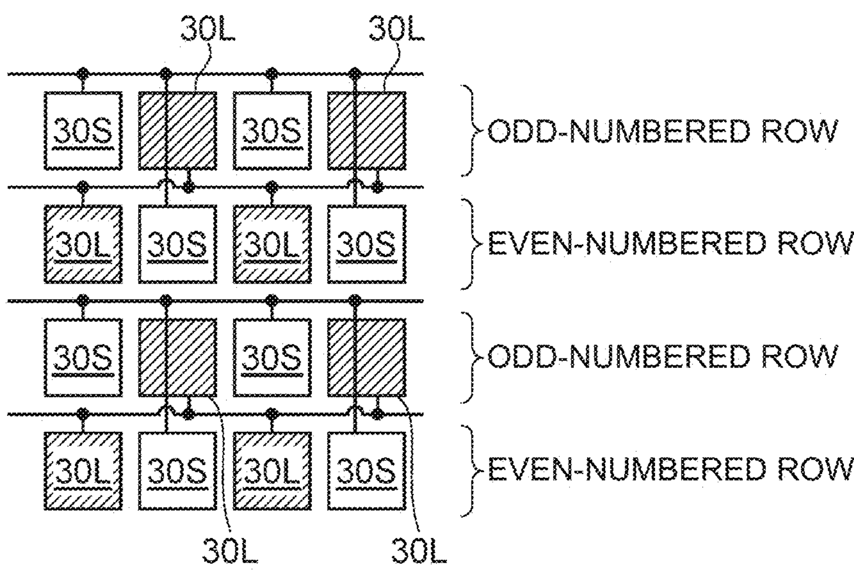
FIG. 32 is a diagram illustrating a connection example of pixel drive lines according to a third embodiment of the present disclosure.
Figure 33:
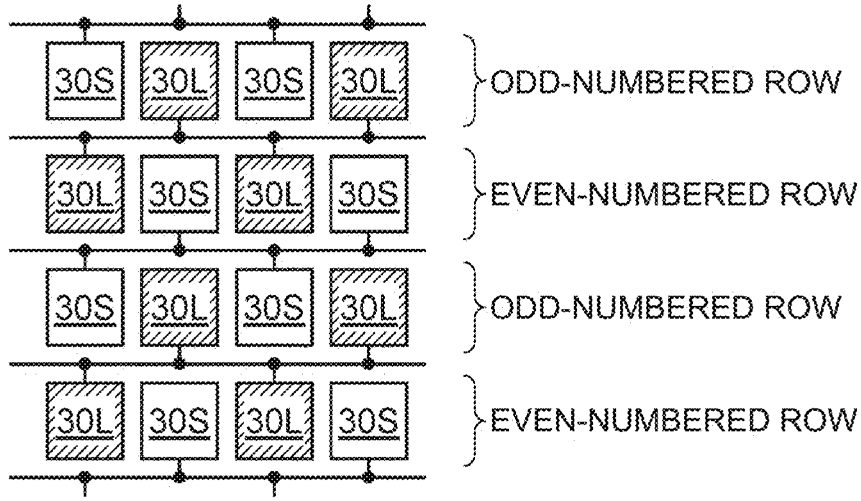
FIG. 33 is a diagram illustrating another connection example of pixel drive lines according to the third embodiment of the present disclosure.

To handle these, as illustrated in FIG. 32 or 33, the present embodiment changes the structure in which pixels 30 in one row are controlled by one pixel drive line LD in the known technique to the structure of controlling long charge accumulation pixels 30L or short charge accumulation pixels 30S dispersedly disposed in two rows, by using one pixel drive line LD. Specifically, the short charge accumulation pixel 30S and the long charge accumulation pixel 30L having different charge accumulation time lengths are arrayed in the diagonal direction (that is, in alternately in the row direction and the column direction), and at the same time, one horizontal signal line is connected to the pixels 30 (the short charge accumulation pixels 30S or the long charge accumulation pixels 30L) having the same charge accumulation time and disposed separately in two rows.

This makes it possible to evenly and uniformly arrange the pixels 30 (the short charge accumulation pixels 30S or the long charge accumulation pixels 30L) having different charge accumulation time over the entire pixel array section 321 while suppressing an increase in the number of horizontal signal lines. This makes it possible to achieve uniform spatial frequency in the vertical direction and the horizontal direction of each of the short charge accumulation pixels 30S and the long charge accumulation pixels 30L. As a result, it is possible to acquire an HDR image suppressing image quality degradation.

However, as illustrated in FIG. 34(A), when readout is executed for the short charge accumulation pixels 30S or the long charge accumulation pixels 30L alternately arrayed so as not to be adjacent to each other over two vertically arranged rows by using a drive system similar to the drive system for the pixel array section 21A applying the Bayer array, the result will be such that, as illustrated in FIG. 34(B), the pixels 30 having the same charge accumulation time are read as image data alternately for one row. This would cause occurrence of a difference between actual pixel arrays of the short charge accumulation pixels 30S and the long charge accumulation pixels 30L in the pixel array section 321 and the pixel arrays of the short charge accumulation pixels 30S and the long charge accumulation pixels 30L in the read image data.

Figure 34:
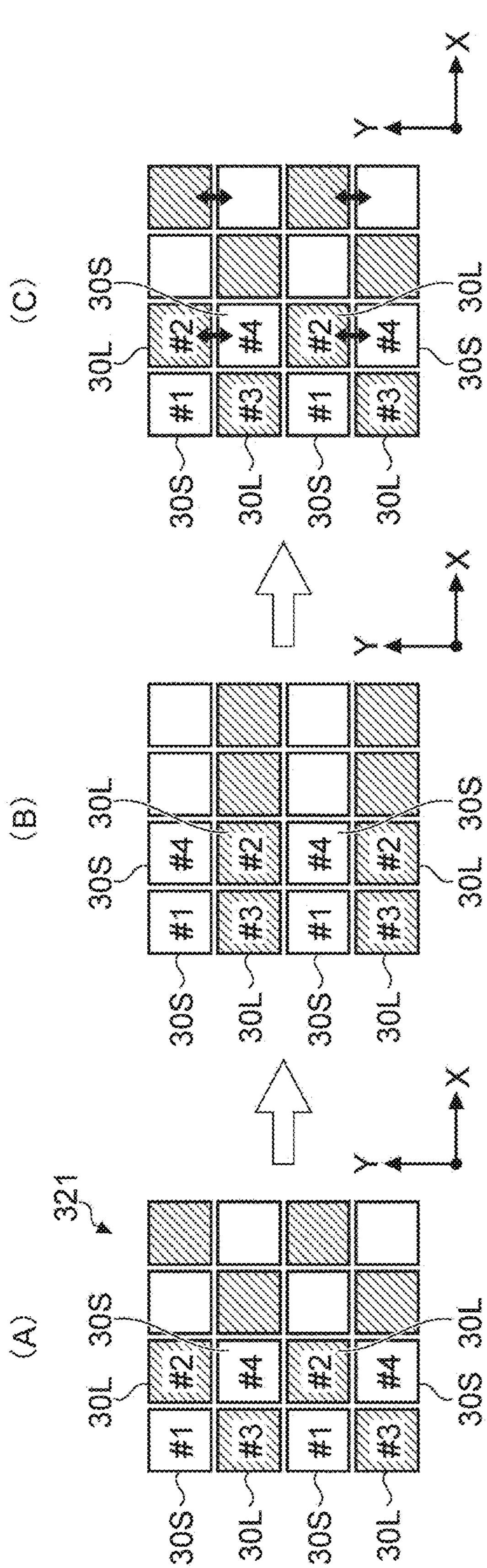
FIG. 34 is a block diagram illustrating a configuration for executing remosaic processing according to the third embodiment of the present disclosure.

Therefore, as illustrated in FIG. 34(C), the present embodiment may execute remosaic processing of exchanging the short charge accumulation pixels 30S and the long charge accumulation pixels 30L in every other line in the read image data. In the example illustrated in FIG. 34, it is allowable to execute remosaic processing of exchanging the long charge accumulation pixel 30L assigned with #2 and the short charge accumulation pixel 30S assigned with #4 in the even-numbered column from the left. This makes it possible achieve matching between the actual pixel arrays of the short charge accumulation pixel 30S and the long charge accumulation pixel 30L in the pixel array section 321 and the pixel arrays of the short charge accumulation pixel 30S and the long charge accumulation pixel 30L in the read image data. This makes it possible to achieve uniform spatial frequencies in the vertical direction and the horizontal direction of the short charge accumulation pixel 30S and the long charge accumulation pixel 30L, leading to acquisition of an HDR image suppressing image quality degradation.

Incidentally, the remosaic processing according to the present embodiment can be implemented using, for example, a configuration similar to the configuration for executing the remosaic processing described with reference to FIG. 15 in the first embodiment. For example, in the example illustrated in FIG. 34, first, the first line data read from the pixel array section 321 and subjected to AD conversion is temporarily stored in the line buffer 101-1, and similarly, the second line data is temporarily stored in the line buffer 101-2. Subsequently, the remosaic processing section 102 alternately reads the pixel value of the short charge accumulation pixel 30S and the pixel value of the long charge accumulation pixel 30L from the second line data and the third line data stored in the line buffers 101-1 and 101-2, thereby generating and outputting image data for one line. Thereafter, by repeating the similar operation for every two rows, output image data of a pixel array that matches the actual pixel array in the pixel array section 321 is output.

Note that this remosaic processing may be executed, for example, in the column processing circuit 23, in the signal processing section 26, or in the processor 13 outside the image sensor 10, for example. However, in a case where the pixel array section 321 is driven to allow the pixel array in the image data read from the pixel array section 321 to match the actual pixel array of the pixel array section 321, the remosaic processing described above may be omitted.

Since other configurations, operations, and effects may be similar to those in the above-described embodiment, detailed description will be omitted here.

3.1 Modification

Figure 35:
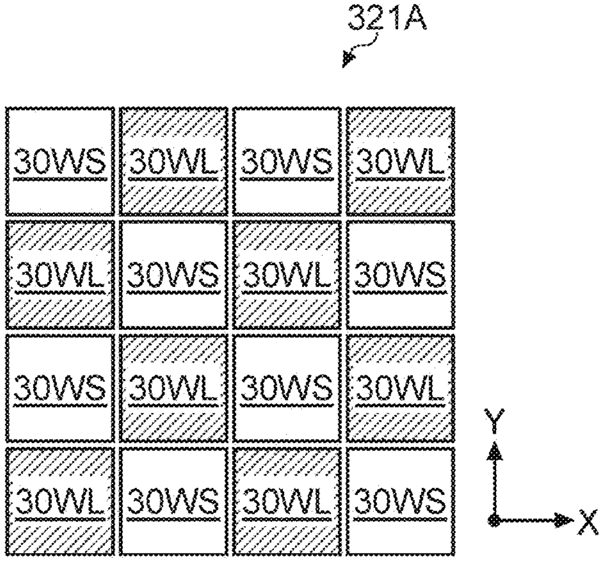
FIG. 35 is a plan view illustrating a pixel layout example according to the third embodiment of the present disclosure.

The configuration in which the pixels 30S having different charge accumulation time lengths are arrayed in the diagonal direction so as not to be adjacent to each other over a plurality of vertically arranged rows as in the third embodiment described above is not limited to the pixel array section 321A having the structure (refer to FIG. 32 or 33, for example) in which the pixels (in the present example, the W pixels 30WS and 30WL having different charge accumulation time lengths) of single colors with different charge accumulation time lengths are alternately arrayed in both the vertical and horizontal directions as illustrated in FIG. 35 as illustrated in the second embodiment described above. The configuration is also suitable for, for example, a configuration in which pixels of the same color arrayed in the diagonal direction are added (refer to the second embodiment described above) as illustrated in FIGS. 36 to 39.

Figure 36:
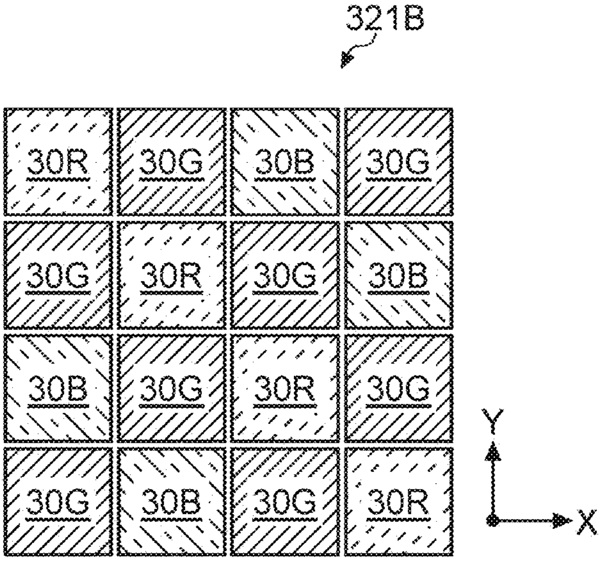
FIG. 36 is a plan view (part 1) illustrating a pixel layout example according to the third embodiment of the present disclosure.

Note that a pixel array section 321B illustrated in FIG. 36 has a pixel layout structure in which the R pixel 30R, the G pixel 30G, and the B pixel 30B are each arrayed in diagonal directions, similarly to the pixel array section 221 described with reference to FIG. 21 in the second embodiment.

Figure 37:
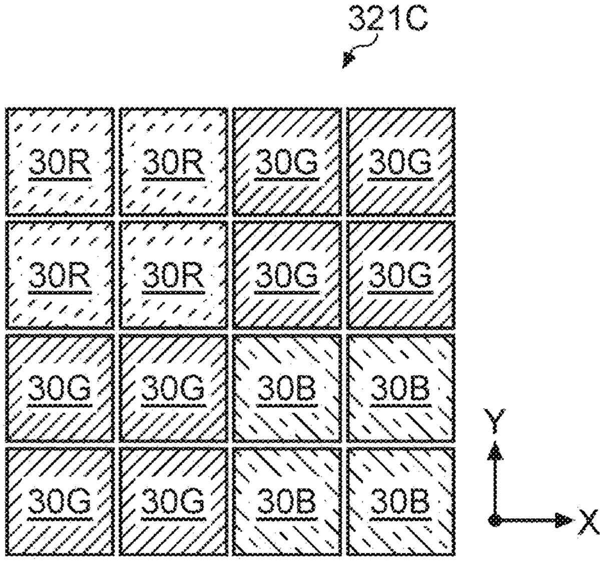
FIG. 37 is a plan view (part 2) illustrating a pixel layout example according to the third embodiment of the present disclosure.

A pixel array section 321C illustrated in FIG. 37 has a pixel layout structure in which the quad Bayer array described with reference to FIG. 8 in the first embodiment is used as a basic unit.

Figure 38:
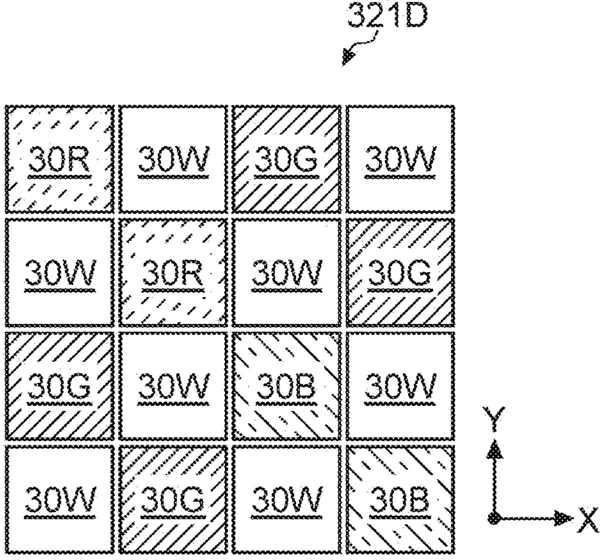
FIG. 38 is a plan view (part 3) illustrating a pixel layout example according to the third embodiment of the present disclosure.

Similarly to the pixel array section 221A described with reference to FIG. 23 as the first modification of the second embodiment, a pixel array section 321D illustrated in FIG. 38 has a pixel layout structure in which the W pixels 30W, in addition to the R pixel 30R, the G pixel 30G, and the B pixel 30B, are individually arrayed in diagonal directions.

Figure 39:
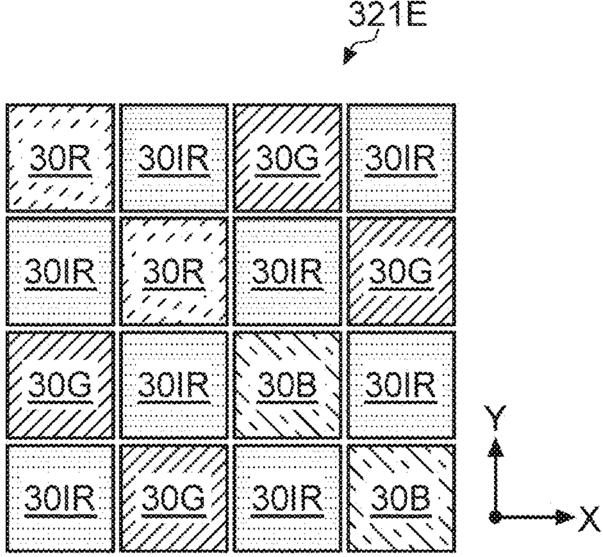
FIG. 39 is a plan view (part 4) illustrating a pixel layout example according to the third embodiment of the present disclosure.

Similarly to the pixel array section 221B described with reference to FIG. 24 as the second modification of the second embodiment, a pixel array section 321E illustrated in FIG. 39 has a pixel layout structure in which the IR pixels 30IR, in addition to the R pixel 30R, the G pixel 30G, and the B pixel 30B, are individually arrayed in diagonal directions.

In this manner, the configuration in which one pixel drive line LD is connected to the pixels 30 in a plurality of rows is also suitable for a pixel layout structure in which pixels of the same color to be added are disposed in the diagonal direction over a plurality of rows. In addition, by applying a configuration in which one pixel drive line LD is connected to pixels 30 in a plurality of rows to a pixel layout structure in which pixels of the same color to be added are disposed in diagonal directions over a plurality of rows, it is possible to decrease the pixel pitch, making it possible to acquire a high resolution image with higher image quality. The pixel layout structure that can apply the configuration in which one pixel drive line LD is connected to the pixels 30 in a plurality of rows is not limited to the above-described example, and various modifications can be made.

4. Example of Application to Smartphone

The technology according to the present disclosure (the present technology) is further applicable to various products. For example, the technology according to the present disclosure may be applied to a smartphone or the like. Therefore, a configuration example of a smartphone 900 as an electronic device to which the present technology is applied will be described with reference to FIG. 40. FIG. 40 is a block diagram illustrating an example of a schematic functional configuration of the smartphone 900 to which the technology according to the present disclosure (present technology) is applicable.

As illustrated in FIG. 40, the smartphone 900 includes a central processing unit (CPU) 901, read only memory (ROM) 902, and random access memory (RAM) 903. In addition, the smartphone 900 includes a storage device 904, a communication module 905, and a sensor module 907. The smartphone 900 further includes an imaging device 1, a display device 910, a speaker 911, a microphone 912, an input device 913, and a bus 914. The smartphone 900 may include a processing circuit such as a digital signal processor (DSP) instead of or in addition to the CPU 901.

The CPU 901 functions as an arithmetic processing device and a control device, and controls all or part of the operation in the smartphone 900 according to various programs recorded in the ROM 902, the RAM 903, the storage device 904, or the like. The ROM 902 stores programs and calculation parameters used by the CPU 901. The RAM 903 primarily stores a program used in the execution of the CPU 901, parameters that change appropriately in the execution, or the like. The CPU 901, the ROM 902, and the RAM 903 are connected to one another by the bus 914. The storage device 904 is a data storage device configured as an example of a storage section of the smartphone 900. The storage device 904 includes, for example, a magnetic storage unit device such as a hard disk drive (HDD), a semiconductor storage device, an optical storage device, or the like. This storage device 904 stores programs executed by the CPU 901, various data, as well as various data acquired from the outside, and the like.

The communication module 905 is a communication interface constituted with devices such as a communication device for connecting to a communication network 906, for example. Examples of the communication module 905 include a wired or wireless local area network (LAN), Bluetooth (registered trademark), or a wireless USB (WUSB) communication card. Furthermore, the communication module 905 may be an optical communication router, an Asymmetric Digital Subscriber Line (ADSL) router, a modem for various communications, or the like. The communication module 905 performs transmission/reception of signals and the like according to a predetermined protocol such as transmission control protocol/Internet protocol (TCP/IP) over the Internet or with other communication devices. Furthermore, the communication network 906 connected to the communication module 905 is a network connected with a wired or wireless channel, and examples of this include the Internet, a home LAN, infrared communication, or satellite communication.

The sensor module 907 includes various sensors such as a motion sensor (for example, an acceleration sensor, a gyro sensor, or a geomagnetic sensor), a biological information sensor (for example, a pulse sensor, a blood pressure sensor, or a fingerprint sensor), or a position sensor (for example, a global navigation satellite system (GNSS) receiver), for example.

The imaging device 1 is provided on the surface of the smartphone 900, and can image a target object or the like located on the back side or the front side of the smartphone 900. Specifically, the imaging device 1 can include: an imaging element (not illustrated) such as a Complementary MOS (CMOS) image sensor to which the technology (present technology) according to the present disclosure is applicable; and a signal processing circuit (not illustrated) that performs imaging signal processing on a signal obtained by photoelectric conversion on the imaging element. Furthermore, the imaging device 1 can further include: an optical system mechanism (not illustrated) including an imaging lens, a zoom lens, and a focus lens; and a drive system mechanism (not illustrated) that controls the operation of the optical system mechanism. Then, the imaging element collects incident light from the target object as an optical image, and the signal processing circuit performs photoelectric conversion of the obtained optical image in units of pixels, reads a signal of each pixel as an imaging signal, and performs image processing, thereby acquiring a captured image.

The display device 910 is provided on the surface of the smartphone 900, and can be, for example, a display device such as a liquid crystal display (LCD) or an organic electro luminescence (EL) display. The display device 910 can display an operation screen, a captured image acquired by the above-described imaging device 1, and the like.

The speaker 911 can output, to the user, a voice on a phone, a voice accompanying the video content displayed by the display device 910 described above, for example.

The microphone 912 can collect, for example, a voice of the user on the phone, a voice including a command to activate a function of the smartphone 900, and a voice in a surrounding environment of the smartphone 900.

The input device 913 is a device operated by the user, such as a button, a keyboard, a touch panel, or a mouse. The input device 913 includes an input control circuit that generates an input signal on the basis of information input by the user and outputs the input signal to the CPU 901. By operating the input device 913, the user can input various data to the smartphone 900 and give an instruction on the processing operation.

The configuration example of the smartphone 900 has been described above. Each of the above-described components may be constituted by using a general-purpose member, or may be constituted by hardware specialized for the function of each of the components. Such a configuration can be appropriately modified according to the technical level at the time of implementation.

5. Example of Application to Mobile Body

The technology according to the present disclosure (the present technology) is applicable to various products. For example, the technology according to the present disclosure may be applied to devices mounted on any of mobile body such as automobiles, electric vehicles, hybrid electric vehicles, motorcycles, bicycles, personal mobility, airplanes, drones, ships, and robots.

Figure 41:
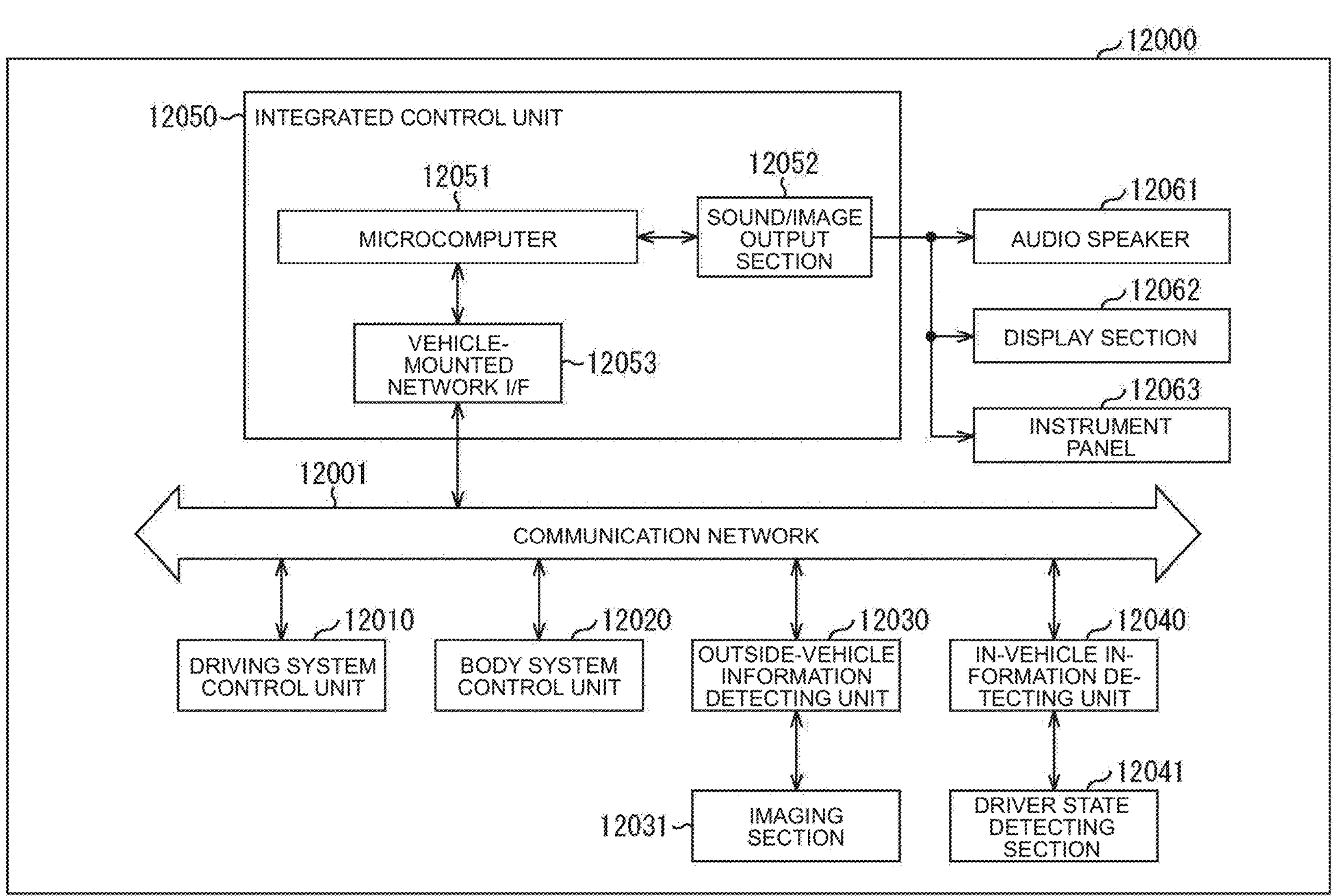
FIG. 41 is a block diagram illustrating an example of a schematic configuration of a vehicle control system.

FIG. 41 is a block diagram illustrating a schematic configuration example of a vehicle control system, which is an example of a mobile body control system to which the technology according to the present disclosure is applicable.

A vehicle control system 12000 includes a plurality of electronic control units connected to each other via a communication network 12001. In the example illustrated in FIG. 41, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various types of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device of generating the braking force of the vehicle, and the like.

The body system control unit 12020 controls the operation of various types of devices provided to a vehicle body in accordance with various types of programs. For example, the body system control unit 12020 functions as a control device for a keyless entry system, a smart key system, a power window device, or various types of lamps such as a headlamp, a backup lamp, a brake lamp, a turn signal, a fog lamp, or the like. In this case, radio waves transmitted from a mobile device as an alternative to a key or signals of various types of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information regarding the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. Based on the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information regarding a measured distance. In addition, the light received by the imaging section 12031 may be visible light, or may be invisible light such as infrared rays.

The in-vehicle information detecting unit 12040 detects information regarding the inside of the vehicle. The in-vehicle information detecting unit 12040 is, for example, connected with a driver state detecting section 12041 that detects the state of a driver. The driver state detecting section 12041, for example, includes a camera that images the driver. Based on detection information input from the driver state detecting section 12041, the in-vehicle information detecting unit 12040 may calculate a degree of fatigue of the driver or a degree of concentration of the driver, or may determine whether the driver is dozing.

The microcomputer 12051 can computes a control target value for the driving force generating device, the steering mechanism, or the braking device based on the information regarding the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which allows the vehicle to travel autonomously without depending on the operation of the driver, or the like, by controlling the driving force generating device, the steering mechanism, the braking device, or the like based on the information regarding the outside or inside of the vehicle which information is obtained by the outside-vehicle information detecting unit 12030 or the in-vehicle information detecting unit 12040.

In addition, the microcomputer 12051 can output a control command to the body system control unit 12020 based on the information regarding the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 41, an audio speaker 12061, a display section 12062, and an instrument panel 12063 are illustrated as the output device. The display section 12062 may, for example, include at least one of an on-board display and a head-up display.

Figure 42:
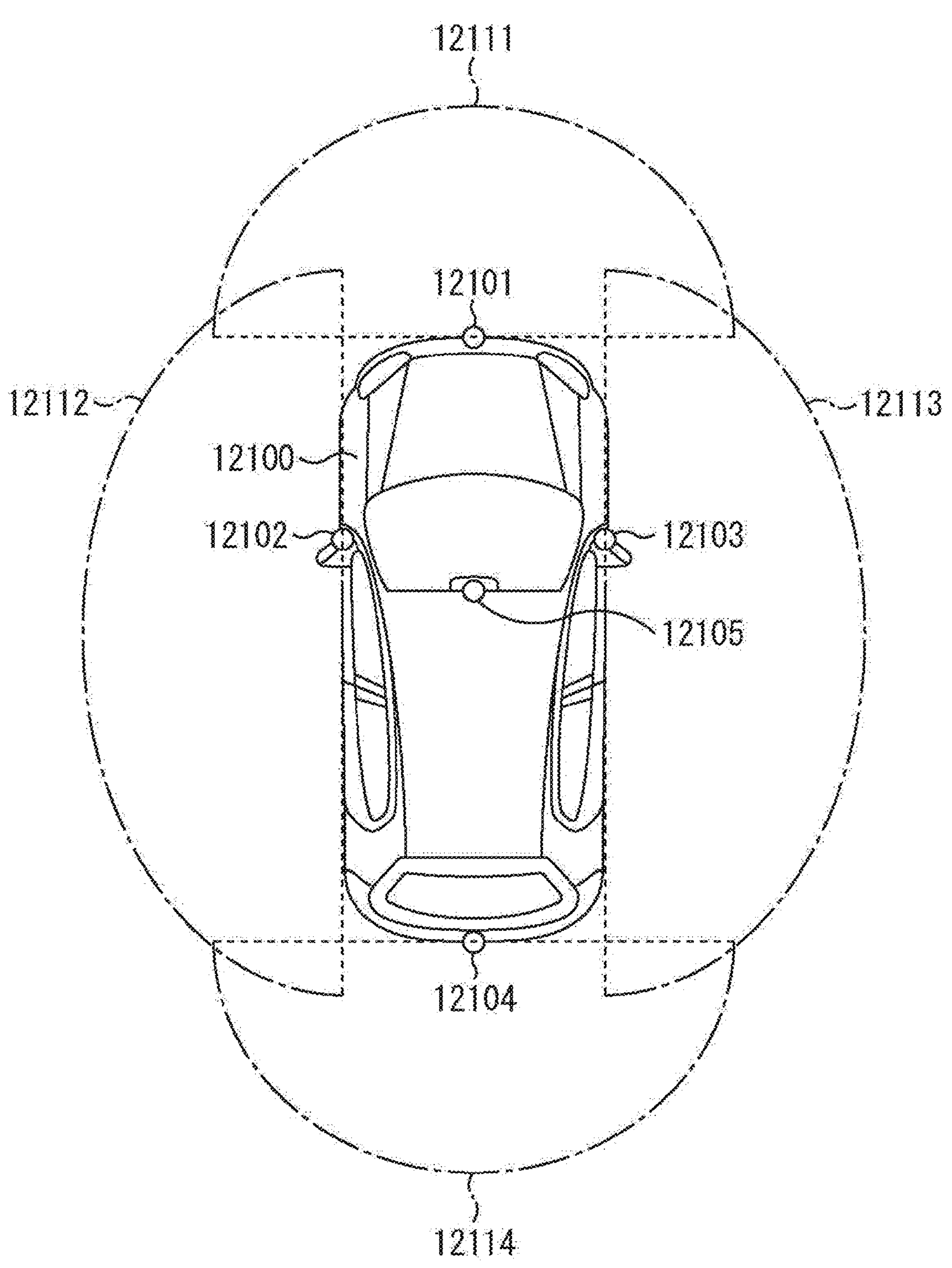
FIG. 42 is a diagram of assistance in explaining an example of installation positions of an outside-vehicle information detecting section and an imaging section.

FIG. 42 is a diagram illustrating an example of an installation position of the imaging section 12031.

In FIG. 42, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 42 illustrates an example of image capturing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) based on the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Furthermore, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that allows the vehicle to travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects based on the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether there is a pedestrian in imaged images of the imaging sections 12101 to 12104. Such recognition of a pedestrian is, for example, performed by a procedure of extracting feature points in the captured images of the imaging sections 12101 to 12104 as infrared cameras and a procedure of determining whether it is the pedestrian by performing pattern matching processing on a series of feature points representing the contour of the object. When the microcomputer 12051 determines that there is a pedestrian in the captured images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Hereinabove, an example of the vehicle control system to which the technology according to the present disclosure is applicable has been described. The technology according to the present disclosure can be suitably applied to the imaging section 12031 and the like among the configurations described above. By applying the technology according to the present disclosure to the imaging section 12031, it is possible to achieve and higher visibility in captured image, leading to alleviation of driver's fatigue.

6. Example of Application to Endoscopic Surgery System

The technology according to the present disclosure (the present technology) is applicable to various products. For example, the techniques according to the present disclosure may be applied to endoscopic surgery systems.

Figure 43:
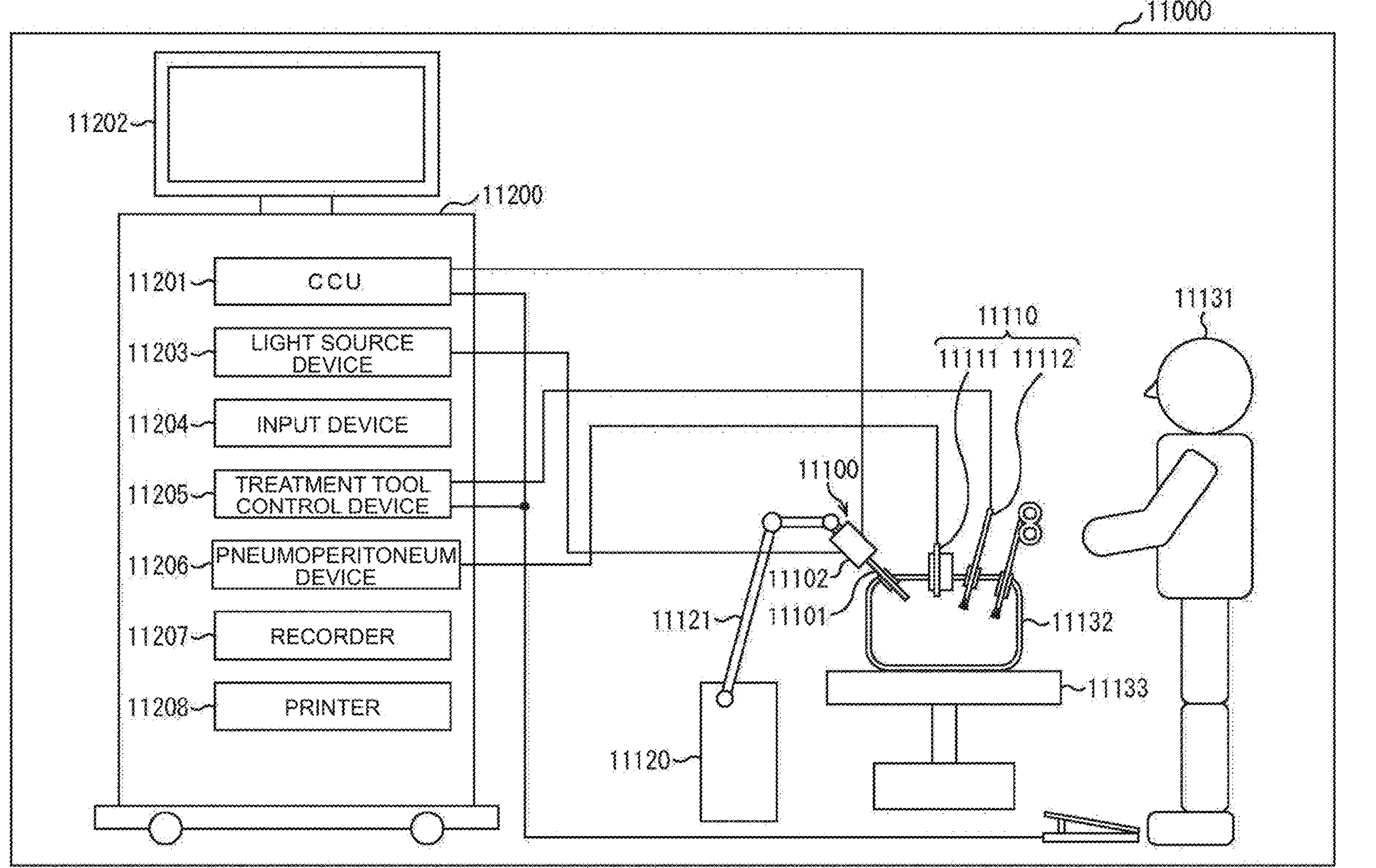
FIG. 43 is a view illustrating an example of a schematic configuration of an endoscopic surgery system.

FIG. 43 is a view illustrating an example of a schematic configuration of an endoscopic surgery system to which the technology according to an embodiment of the present disclosure (present technology) is applicable.

FIG. 43 illustrates a state in which a surgeon (medical doctor) 11131 is using an endoscopic surgery system 11000 to perform surgery for a patient 11132 on a patient bed 11133. As illustrated, the endoscopic surgery system 11000 includes an endoscope 11100, other surgical tools 11110 such as a pneumoperitoneum tube 11111 and an energy treatment tool 11112, a supporting arm device 11120 which supports the endoscope 11100 thereon, and a cart 11200 on which various device for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. The example illustrates the endoscope 11100 as a rigid endoscope having the lens barrel 11101 of the rigid type. However, the endoscope 11100 may be a flexible endoscope having the lens barrel 11101 of the flexible type.

The lens barrel 11101 has, at a distal end thereof, an opening in which an objective lens is fitted. A light source device 11203 is connected to the endoscope 11100 such that light generated by the light source device 11203 is introduced to a distal end of the lens barrel 11101 by a light guide extending in the inside of the lens barrel 11101 and is emitted toward an observation target in a body lumen of the patient 11132 through the objective lens. Note that the endoscope 11100 may be a direct view mirror or may be a perspective view mirror or a side view mirror.

An optical system and an imaging element are provided in the inside of the camera head 11102 such that reflected light (observation light) from the observation target is condensed on the imaging element by the optical system. The observation light is subjected to photoelectric conversion by the imaging element to generate an electric signal corresponding to the observation light, namely, an image signal corresponding to an observation image. The image signal is transmitted as RAW data to a Camera Control Unit (CCU) 11201.

The CCU 11201 includes a central processing unit (CPU), a graphics processing unit (GPU) or the like and integrally controls operation of the endoscope 11100 and a display device 11202. Furthermore, the CCU 11201 receives an image signal from the camera head 11102 and performs, for the image signal, various image processing for displaying an image based on the image signal such as, for example, development processing (demosaic processing).

The display device 11202 displays thereon an image based on an image signal, for which image processing have been performed by the CCU 11201, under the control of the CCU 11201.

The light source device 11203 includes a light source such as a light emitting diode (LED), for example, and supplies irradiation light upon imaging of a surgical region to the endoscope 11100.

An inputting device 11204 is an input interface for the endoscopic surgery system 11000. A user can perform input of various types of information or instruction input to the endoscopic surgery system 11000 through the inputting device 11204. For example, the user inputs an instruction or a like to change an imaging condition (type of irradiation light, magnification, focal distance or the like) by the endoscope 11100.

A treatment tool control device 11205 controls driving of the energy treatment tool 11112 for cautery or incision of a tissue, sealing of a blood vessel or the like. A pneumoperitoneum device 11206 feeds gas into a body lumen of the patient 11132 through the pneumoperitoneum tube 11111 to inflate the body lumen in order to ensure the field of view of the endoscope 11100 and ensure the working space for the surgeon. A recorder 11207 is a device capable of recording various types of information related to surgery. A printer 11208 is a device capable of printing various types of information related to surgery in various forms such as a text, an image or a graph.

Note that the light source device 11203 which supplies irradiation light when a surgical region is to be imaged to the endoscope 11100 may include a white light source which includes, for example, an LED, a laser light source or a combination of these. In a case where a white light source includes a combination of red, green, and blue (RGB) laser light sources, the output intensity and the output timing can be controlled with high accuracy for each color (each wavelength), making it possible to adjust the white balance of a captured image in the light source device 11203. Furthermore, in this case, by irradiating the observation target with laser beams from the individual RGB laser light sources in time division and controlling driving of the imaging elements of the camera head 11102 in synchronization with the irradiation timings, it is also possible to capture the images individually corresponding to the R, G and B colors in time division. According to this method, a color image can be obtained even with no color filters provided for the imaging element.

Furthermore, the light source device 11203 may be controlled so as to change the intensity of light to be output for each predetermined time. By controlling driving of the imaging element of the camera head 11102 in synchronization with the timing of the change of the intensity of light to acquire images in time-division and combining the images, it is possible to generate an image of a high dynamic range free from underexposed blocked up shadows or overexposed highlights.

Furthermore, the light source device 11203 may be configured to be able to supply light of a predetermined wavelength band ready for special light observation. The special light observation includes, for example, narrow band observation (narrow band imaging) which utilizes the wavelength dependency of absorption of light in a body tissue to apply light of a narrower band in comparison with irradiation light in ordinary observation (namely, white light), thereby performing high-contrast imaging of a predetermined tissue such as a blood vessel of a superficial portion of the mucous membrane or the like. Alternatively, the special light observation may include fluorescent observation for obtaining an image from fluorescent light generated by emission of excitation light. In fluorescent observation, it is possible to perform observation of fluorescent light from a body tissue by irradiating the body tissue with excitation light (autofluorescence observation) or to obtain a fluorescent light image by locally injecting a reagent such as indocyanine green (ICG) into a body tissue and irradiating the body tissue with excitation light corresponding to a fluorescent light wavelength of the reagent. The light source device 11203 can be configured to be able to supply such narrow-band light and/or excitation light suitable for special light observation.

Figure 44:
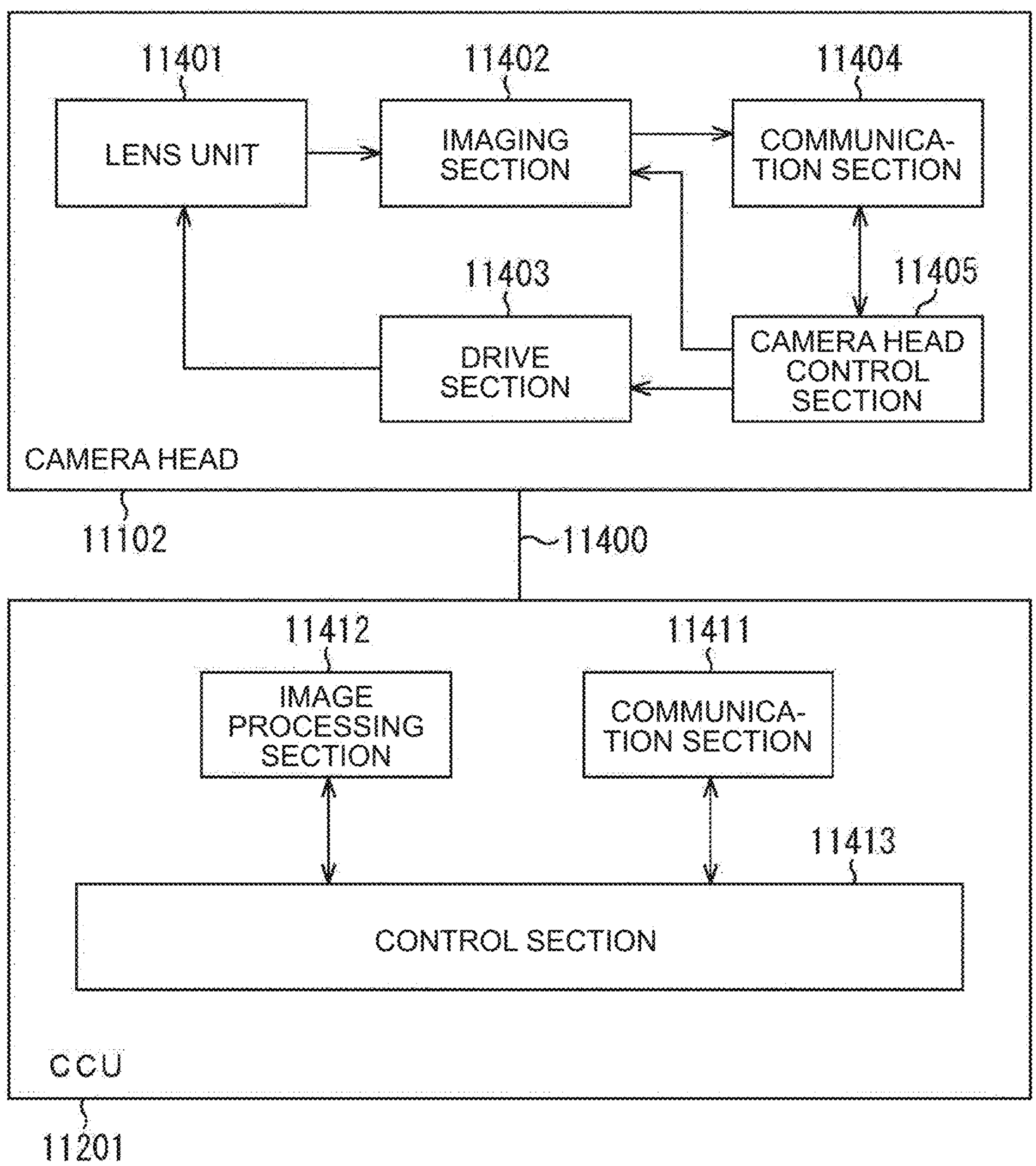
FIG. 44 is a block diagram illustrating an example of a functional configuration of a camera head and a CCU.

FIG. 44 is a block diagram illustrating an example of a functional configuration of the camera head 11102 and the CCU 11201 illustrated in FIG. 43.

The camera head 11102 includes a lens unit 11401, an imaging section 11402, a drive section 11403, a communication section 11404 and a camera head control section 11405. The CCU 11201 includes a communication section 11411, an image processing section 11412 and a control section 11413. The camera head 11102 and the CCU 11201 are communicably connected to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The imaging elements which is included by the imaging section 11402 may be provided as one element (single-plate type) or a plurality of elements (multiple-plate type). Where the imaging section 11402 is configured as that of the multiple-plate type, for example, image signals individually corresponding to R, G and B are generated by the imaging elements, and the individual image signals may be combined to obtain a color image. The imaging section 11402 may also be configured so as to have a pair of imaging elements for acquiring image signals individually for the right eye and the left eye ready for three dimensional (3D) display. With 3D display, the depth of a biological tissue in a surgical region can be comprehended more accurately by the surgeon 11131. Note that, when the imaging section 11402 is configured as a multiple-plate type, a plurality of systems of lens units 11401 can be provided corresponding to the individual imaging elements.

Furthermore, the imaging section 11402 is not necessarily to be provided on the camera head 11102. For example, the imaging section 11402 may be provided immediately behind the objective lens inside the lens barrel 11101.

The drive section 11403 includes an actuator and moves the zoom lens and the focusing lens of the lens unit 11401 by a predetermined distance along an optical axis under the control of the camera head control section 11405. Consequently, the magnification and the focal point of a captured image by the imaging section 11402 can be adjusted appropriately.

The communication section 11404 includes a communication device for transmitting and receiving various types of information to and from the CCU 11201. The communication section 11404 transmits an image signal acquired from the imaging section 11402 as RAW data to the CCU 11201 through the transmission cable 11400.

In addition, the communication section 11404 receives a control signal for controlling driving of the camera head 11102 from the CCU 11201 and supplies the control signal to the camera head control section 11405. The control signal includes information related to imaging conditions, such as, for example, information regarding designation of a frame rate of a captured image, information regarding designation of an exposure value at imaging and/or information regarding designation of a magnification and a focal point of a captured image.

Note that the imaging conditions such as the above-described frame rate, exposure value, magnification or focal point may be designated by the user or may be set automatically by the control section 11413 of the CCU 11201 on the basis of an acquired image signal. In the latter case, an auto exposure (AE) function, an auto focus (AF) function and an auto white balance (AWB) function are to be incorporated in the endoscope 11100.

The camera head control section 11405 controls driving of the camera head 11102 on the basis of a control signal from the CCU 11201 received through the communication section 11404.

The communication section 11411 includes a communication device for transmitting and receiving various types of information to and from the camera head 11102. The communication section 11411 receives an image signal transmitted thereto from the camera head 11102 through the transmission cable 11400.

Furthermore, the communication section 11411 transmits a control signal for controlling driving of the camera head 11102 to the camera head 11102. The image signal and the control signal can be transmitted by electrical communication, optical communication or the like.

The image processing section 11412 performs various types of image processing for an image signal in the form of RAW data transmitted thereto from the camera head 11102.

The control section 11413 performs various types of control related to imaging of a surgical region or the like by the endoscope 11100 and display of a captured image obtained by imaging of the surgical region or the like. For example, the control section 11413 generates a control signal for controlling driving of the camera head 11102.

Furthermore, on the basis of an image signal subjected to image processing by the image processing section 11412, the control section 11413 controls the display device 11202 to display the captured image including an image of the surgical region or the like. Thereupon, the control section 11413 may recognize various objects in the captured image using various image recognition technologies. For example, the control section 11413 can recognize a surgical tool such as forceps, a particular biological region, bleeding, mist when the energy treatment tool 11112 is used and the like by detecting the shape, color of edges of objects, or the like included in a captured image. The control section 11413 may cause, when it controls the display device 11202 to display a captured image, various types of surgery assistance information to be displayed so as to be superimposed on an image of the surgical region using a result of the recognition. By surgery assistance information displayed as a superimposed image so as to be presented to the surgeon 11131, it is possible to reduce the burden on the surgeon 11131, making it possible for the surgeon 11131 to proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

While communication is performed by wired communication using the transmission cable 11400 in the illustrated example, the communication between the camera head 11102 and the CCU 11201 may be performed by wireless communication.

An example of the endoscopic surgery system to which the technology according to the present disclosure is applicable has been described above. The technology according to the present disclosure is applicable to the imaging section 11402 of the camera head 11102 among the configurations described above. By applying the technology according to the present disclosure to the camera head 11102, a clearer image of the operation site can be obtained, making it possible for the surgeon to reliably confirm the operation site.

Although the endoscopic surgery system has been described here as an example, the technology according to the present disclosure may be applied to, for example, a microscopic surgery system or the like.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technique can also have the following configurations.

(1)

A solid-state imaging device comprising:

a pixel array section in which a plurality of pixels is arrayed in a matrix, the pixels including a plurality of first pixels that performs photoelectric conversion of light of a first wavelength component, wherein each of the pixels includes:

a photoelectric conversion section that performs photoelectric conversion of incident light;

a transfer transistor that controls transfer of a charge generated in the photoelectric conversion section;

a floating diffusion region that accumulates the charge transferred from the photoelectric conversion section via the transfer transistor; and an amplification transistor that causes a voltage signal corresponding to the charge accumulated in the floating diffusion region to emerge in a signal line, the plurality of first pixels is arrayed in a first diagonal direction in the pixel array section, and at least two first pixels of the plurality of first pixels arrayed in the first diagonal direction share one region defined as the floating diffusion region.

(2)

The solid-state imaging device according to (1), wherein the pixel array section includes a plurality of combinations of at least two first pixels sharing one floating diffusion region, and the combinations of the at least two first pixels are regularly arrayed in the pixel array section.

(3)

The solid-state imaging device according to (1) or (2), wherein the floating diffusion region is disposed between the at least two first pixels sharing the floating diffusion region.

(4)

The solid-state imaging device according to any one of (1) to (3), wherein the plurality of pixels each includes a plurality of second pixels that performs photoelectric conversion of light of a second wavelength component different from the first wavelength component, the plurality of second pixels is arrayed in a column direction in the pixel array section, and at least two second pixels arrayed every other pixel in the column direction, among the plurality of second pixels, share one region defined as the floating diffusion region.

(5)

The solid-state imaging device according to (4), wherein the one floating diffusion region shared by the at least two first pixels and the one floating diffusion region shared by the at least two second pixels are an identical floating diffusion region.

(6)

The solid-state imaging device according to (4) or (5), further comprising a processing section that rearrange a pixel array of image data read from the pixel array section.

(7)

The solid-state imaging device according to any one of (1) to (6), further comprising a correcting section that corrects an image value read from each of the plurality of pixels.

(8)

The solid-state imaging device according to any one of (1) to (7), further comprising a drive circuit that drives the plurality of pixels such that exposure of the plurality of pixels is simultaneously started.

(9)

The solid-state imaging device according to any one of (1) to (8), wherein the pixel array section includes a color filter array having a Bayer array as a repeating unit.

(10)

The solid-state imaging device according to any one of (1) to (8), wherein the pixel array section includes a color filter array having a quad Bayer array as a repeating unit.

(11)

The solid-state imaging device according to any one of (1) to (8), wherein the pixel array section includes a color filter array having an RGBW array as a repeating unit.

(12)

The solid-state imaging device according to any one of (1) to (3), wherein the plurality of pixels each includes a plurality of second pixels that performs photoelectric conversion of light of a second wavelength component different from the first wavelength component, the plurality of second pixels is arrayed in a second diagonal direction intersecting the first diagonal direction in the pixel array section, and at least two second pixels of the plurality of second pixels arrayed in the second diagonal direction share one region defined as the floating diffusion region.

(13)

The solid-state imaging device according to (12), wherein the one floating diffusion region shared by the at least two first pixels and the one floating diffusion region shared by the at least two second pixels are an identical floating diffusion region.

(14)

The solid-state imaging device according to (12) or (13), wherein the plurality of pixels includes a plurality of third pixels that each performs photoelectric conversion of light of a third wavelength component different from the first wavelength component and the second wavelength component, the plurality of third pixels is arrayed in a column direction and a row direction in the pixel array section, and at least two third pixels arrayed every other pixel in the column direction or the row direction, among the plurality of third pixels, share one region defined as the floating diffusion regions.

(15)

The solid-state imaging device according to (12) or (13), wherein the plurality of pixels includes the plurality of first pixels, the plurality of second pixels, and a plurality of third pixels, the plurality of third pixels each provided to perform photoelectric conversion of light of a third wavelength component different from the first wavelength component and the second wavelength component, and the pixel array section includes a color filter array having a first unit and a second unit as a repeating unit, the first unit including one or more of the first pixels and one or more of the second pixels arrayed in a matrix, the second unit including one or more of the first pixels and one or more of the third pixels arrayed in a matrix.

(16)

The solid-state imaging device according to any one of (1) to (15), further comprising:

a drive circuit that drives the plurality of pixels; and a plurality of drive lines extending from the drive circuit and connected to the plurality of pixels, wherein the at least two first pixels arrayed in the first diagonal direction and sharing the one floating diffusion region are connected to an identical drive line.

(17)

An electronic device comprising:

the solid-state imaging device according to any one of (1) to (16); and a processor that executes predetermined processing on image data output from the solid-state imaging device.

(18)

A solid-state imaging device comprising:

a pixel array section including a plurality of pixels arrayed in a matrix;

a drive circuit that drives the plurality of pixels; and a plurality of drive lines extending from the drive circuit and connected to the plurality of pixels, wherein each of the pixels includes:

a photoelectric conversion section that performs photoelectric conversion of incident light;

a transfer transistor that controls transfer of a charge generated in the photoelectric conversion unit;

a floating diffusion region that accumulates the charge transferred from the photoelectric conversion section via the transfer transistor; and an amplification transistor that causes a voltage signal corresponding to the charge accumulated in the floating diffusion region to emerge in a signal line, the plurality of pixels includes a plurality of first pixels and a plurality of second pixels, the first pixel and the second pixel are each arrayed in a diagonal direction in the pixel array section, the first pixels arrayed in two adjacent rows in the pixel array section are connected to an identical first drive line, and the second pixels arrayed in two adjacent rows in the pixel array section are connected to an identical second drive line different from the first drive line.

(19)

The solid-state imaging device according to (18), wherein the drive circuit sets a charge accumulation time of the first pixel connected to the first drive line as a first period, and sets a charge accumulation time of the second pixel connected to the second drive line as a second period different from the first period.

(20)

The solid-state imaging device according to (18), wherein the first pixel performs photoelectric conversion of light of a first wavelength component, and the second pixel performs photoelectric conversion of light of a second wavelength component different from the first wavelength component.

(21)

The solid-state imaging device according to any one of (18) to (20), wherein two first pixels arrayed in the diagonal direction, among the first pixels arrayed in two rows, share one region defined as the floating diffusion region, and two second pixels arrayed in the diagonal direction, among the second pixels arrayed in two rows, share one region defined as the floating diffusion region.

(22)

The solid-state imaging device according to (21), wherein the one floating diffusion region shared by the two first pixels and the one floating diffusion shared by the two second pixels are an identical floating diffusion region.

(23)

The solid-state imaging device according to any one of (18) to (22), further comprising a processing section that rearrange a pixel array of image data read from the pixel array section.

(24)

The solid-state imaging device according to any one of (18) to (23), further comprising a correcting section that corrects an image value read from each of the plurality of pixels.

(25)

An electronic device including:

the solid-state imaging device according to any one of (18) to (24); and a processor that executes predetermined processing on image data output from the solid-state imaging device.

REFERENCE SIGNS LIST

1 ELECTRONIC DEVICE (IMAGING DEVICE)
10 SOLID-STATE IMAGING DEVICE (IMAGE SENSOR)
11 IMAGING LENS
13 PROCESSOR
14 STORAGE SECTION
21, 21A, 21B, 221, 221A, 221B, 221C, 221D, 221E, 221F, 321, 321A, 321B, 321C, 321D PIXEL ARRAY SECTION
22 VERTICAL DRIVE CIRCUIT
23 COLUMN PROCESSING CIRCUIT
23*a* AD CONVERSION CIRCUIT
24 HORIZONTAL DRIVE CIRCUIT
25 SYSTEM CONTROLLER
26 SIGNAL PROCESSING SECTION
27 DATA STORAGE SECTION
30, 30A, 100 PIXEL
30B B PIXEL
30G G PIXEL
30IR IR PIXEL
30L LONG CHARGE ACCUMULATION PIXEL
30R R PIXEL
30S SHORT CHARGE ACCUMULATION PIXEL
30W, 30WL, 30WS W PIXEL
31, 31-1 to 31-4, 112 TRANSFER TRANSISTOR
32 RESET TRANSISTOR
33 AMPLIFICATION TRANSISTOR
34, 131, 132 SELECTION TRANSISTOR
41 LIGHT RECEIVING CHIP
42 CIRCUIT CHIP
50A, 50B BASIC UNIT
50*ab*, 50*ar*, 50*arw*, 50*abw*, 50*b*, 50*b*4, 50*b*5, 50*b*5*w*, 50*bir*, 50*bw*, 50*g*5*w*, 50*gir*, 50*gw*, 50*r*, 50*r*4, 50*r*5, 50*r*5*w*, 50*rir*, 50*rw* SHARING UNIT
51 ON-CHIP LENS
52 COLOR FILTER
53 PLANARIZATION FILM
54 LIGHT SHIELDING FILM
55, 63 INSULATING FILM
56, 64 P-TYPE SEMICONDUCTOR REGION
57 LIGHT RECEIVING SURFACE
58 SEMICONDUCTOR SUBSTRATE
59 N-TYPE SEMICONDUCTOR REGION
60 PIXEL ISOLATION SECTION 61 GROOVE
62 FIXED CHARGE FILM
65 WIRING LAYER
66 WIRING, WIRING LINE
67 INSULATING LAYER
101-1 to 101-*n* LINE BUFFER
102 REMOSAIC PROCESSING SECTION
110 FIRST-STAGE CIRCUIT
113 FD RESET TRANSISTOR
115 FIRST-STAGE AMPLIFICATION TRANSISTOR
116 CURRENT SOURCE TRANSISTOR
120 FIRST-STAGE NODE
121, 122 CAPACITIVE ELEMENT
130 SELECTION CIRCUIT
140 LATTER-STAGE NODE
141 LATTER-STAGE RESET TRANSISTOR
150 LATTER-STAGE CIRCUIT
151 LATTER-STAGE AMPLIFICATION TRANSISTOR
152 LATTER-STAGE SELECTION TRANSISTOR
302, 302*a* CIRCUIT CONFIGURATION
FD FLOATING DIFFUSION REGION
LD PIXEL DRIVE LINE
PD, PD1 to PD4 PHOTOELECTRIC CONVERSION SECTION
VSL VERTICAL SIGNAL LINE

The invention claimed is:

1. A solid-state imaging device comprising:

a pixel array section including a plurality of pixels arrayed in a matrix, the pixels including a plurality of first pixels that respectively perform photoelectric conversion of light of a first wavelength component, wherein each of the pixels includes:

a photoelectric conversion section that performs photoelectric conversion of incident light;

a transfer transistor that controls transfer of a charge generated in the photoelectric conversion section;

a floating diffusion region that accumulates the charge transferred from the photoelectric conversion section via the transfer transistor; and an amplification transistor that causes a voltage signal corresponding to the charge accumulated in the floating diffusion region to emerge in a signal line, the plurality of first pixels is arrayed in a first diagonal direction in the pixel array section, and at least two first pixels of the plurality of first pixels arrayed in the first diagonal direction share one region defined as the floating diffusion region, wherein the floating diffusion region is disposed directly between the two first pixels sharing the floating diffusion region along the first diagonal direction.

2. The solid-state imaging device according to claim 1, wherein the pixel array section includes a plurality of combinations of at least two first pixels sharing one floating diffusion region, and the combinations of the at least two first pixels are regularly arrayed in the pixel array section.

3. The solid-state imaging device according to claim 1, wherein the plurality of pixels each includes a plurality of second pixels that performs photoelectric conversion of light of a second wavelength component different from the first wavelength component, the plurality of second pixels is arrayed in a column direction in the pixel array section, and at least two second pixels arrayed every other pixel in the column direction, among the plurality of second pixels, share one region defined as the floating diffusion region.

4. The solid-state imaging device according to claim 3, wherein the one floating diffusion region shared by the at least two first pixels and the one floating diffusion region shared by the at least two second pixels are an identical floating diffusion region.

5. The solid-state imaging device according to claim 3, further comprising a processing section that rearrange a pixel array of image data read from the pixel array section.

6. The solid-state imaging device according to claim 1, further comprising a correcting section that corrects an image value read from each of the plurality of pixels.

7. The solid-state imaging device according to claim 1, further comprising a drive circuit that drives the plurality of pixels such that exposure of the plurality of pixels is simultaneously started.

8. The solid-state imaging device according to claim 1, wherein the pixel array section includes a color filter array having a Bayer array as a repeating unit.

9. The solid-state imaging device according to claim 1, wherein the pixel array section includes a color filter array having a quad Bayer array as a repeating unit.

10. The solid-state imaging device according to claim 1, wherein the pixel array section includes a color filter array having an RGBW array as a repeating unit.

11. The solid-state imaging device according to claim 1, wherein the plurality of pixels each includes a plurality of second pixels that performs photoelectric conversion of light of a second wavelength component different from the first wavelength component, the plurality of second pixels is arrayed in a second diagonal direction intersecting the first diagonal direction in the pixel array section, and at least two second pixels of the plurality of second pixels arrayed in the second diagonal direction share one region defined as the floating diffusion region.

12. The solid-state imaging device according to claim 11, wherein the one floating diffusion region shared by the at least two first pixels and the one floating diffusion region shared by the at least two second pixels are an identical floating diffusion region.

13. The solid-state imaging device according to claim 11, wherein the plurality of pixels includes a plurality of third pixels that each performs photoelectric conversion of light of a third wavelength component different from the first wavelength component and the second wavelength component, the plurality of third pixels is arrayed in a column direction and a row direction in the pixel array section, and at least two third pixels arrayed every other pixel in the column direction or the row direction, among the plurality of third pixels, share one region defined as the floating diffusion regions.

14. The solid-state imaging device according to claim 11, wherein the plurality of pixels includes the plurality of first pixels, the plurality of second pixels, and a plurality of third pixels, the plurality of third pixels each provided to perform photoelectric conversion of light of a third wavelength component different from the first wavelength component and the second wavelength component, and the pixel array section includes a color filter array having a first unit and a second unit as a repeating unit, the first unit including one or more of the first pixels and one or more of the second pixels arrayed in a matrix, the second unit including one or more of the first pixels and one or more of the third pixels arrayed in a matrix.

15. The solid-state imaging device according to claim 1, further comprising:

a drive circuit that drives the plurality of pixels; and a plurality of drive lines extending from the drive circuit and connected to the plurality of pixels, wherein the at least two first pixels arrayed in the first diagonal direction and sharing the one floating diffusion region are connected to an identical drive line.

16. An electronic device comprising:

the solid-state imaging device according to claim 1; and a processor that executes predetermined processing on image data output from the solid-state imaging device.

* * * * *